(12) United States Patent
Menefee et al.

(10) Patent No.: US 11,557,152 B2
(45) Date of Patent: *Jan. 17, 2023

(54) AUTOMATED SIGN LANGUAGE TRANSLATION AND COMMUNICATION USING MULTIPLE INPUT AND OUTPUT MODALITIES

(71) Applicant: Avodah, Inc., Wilmington, DE (US)

(72) Inventors: Michael Menefee, Richardson, TX (US); Dallas Nash, Frisco, TX (US); Trevor Chandler, Thornton, CO (US)

(73) Assignee: AVODAH, INC., Wilmington, DE (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/208,968

(22) Filed: Mar. 22, 2021

(65) Prior Publication Data
US 2021/0279454 A1  Sep. 9, 2021

Related U.S. Application Data

(63) Continuation of application No. 16/694,965, filed on Nov. 25, 2019, now Pat. No. 10,956,725, which is a (Continued)

(51) Int. Cl.
*G06V 40/20* (2022.01)
*G06N 3/08* (2006.01)
(Continued)

(52) U.S. Cl.
CPC .............. *G06V 40/28* (2022.01); *G06F 3/013* (2013.01); *G06F 3/017* (2013.01); *G06F 3/167* (2013.01);
(Continued)

(58) Field of Classification Search
USPC .......................... 382/100, 103, 155–156, 159
See application file for complete search history.

(56) References Cited

U.S. PATENT DOCUMENTS 5,481,454 A  1/1996 Inoue
5,544,050 A  8/1996 Abe
(Continued)

FOREIGN PATENT DOCUMENTS

JP  2017111660 A  6/2017

OTHER PUBLICATIONS

Zheng et al., Sign Language Recognition using Depth Images, 2016 IEEE 978-1-5090-3549-6/16, pp. 1-6 (Year: 2016).*
(Continued)

*Primary Examiner* — Ishrat I Sherali
(74) *Attorney, Agent, or Firm* — Avodah, Inc.

(57) ABSTRACT

Methods, apparatus and systems for recognizing sign language movements using multiple input and output modalities. One example method includes capturing a movement associated with the sign language using a set of visual sensing devices, the set of visual sensing devices comprising multiple apertures oriented with respect to the subject to receive optical signals corresponding to the movement from multiple angles, generating digital information corresponding to the movement based on the optical signals from the multiple angles, collecting depth information corresponding to the movement in one or more planes perpendicular to an image plane captured by the set of visual sensing devices, producing a reduced set of digital information by removing at least some of the digital information based on the depth information, generating a composite digital representation by aligning at least a portion of the reduced set of digital information, and recognizing the movement based on the composite digital representation.

20 Claims, 19 Drawing Sheets

Related U.S. Application Data continuation of application No. 16/258,509, filed on Jan. 25, 2019, now Pat. No. 10,489,639.

(60) Provisional application No. 62/664,883, filed on Apr. 30, 2018, provisional application No. 62/629,398, filed on Feb. 12, 2018.

(51) Int. Cl.

| | | |
|---|---|---|
| *G06F 3/01* | (2006.01) | |
| *G09B 21/00* | (2006.01) | |
| *G06F 40/40* | (2020.01) | |
| *G06F 40/58* | (2020.01) | |
| *G10L 15/26* | (2006.01) | |
| *G06V 40/16* | (2022.01) | |
| *G06F 3/16* | (2006.01) | |
| *G10L 15/22* | (2006.01) | |
| *G10L 15/24* | (2013.01) | |
| *H04N 5/247* | (2006.01) | |
| *G06T 7/73* | (2017.01) | |
| *G06N 3/04* | (2006.01) | |
| *G06T 7/20* | (2017.01) | |
| *G10L 13/00* | (2006.01) | |
| *G06N 20/00* | (2019.01) | |
| *G06T 3/40* | (2006.01) | |
| *G06T 17/00* | (2006.01) | |

(52) U.S. Cl.
CPC .............. *G06F 40/40* (2020.01); *G06F 40/58* (2020.01); *G06N 3/0454* (2013.01); *G06N 3/08* (2013.01); *G06T 7/20* (2013.01); *G06T 7/73* (2017.01); *G06V 40/165* (2022.01); *G06V 40/176* (2022.01); *G09B 21/00* (2013.01); *G09B 21/009* (2013.01); *G10L 15/22* (2013.01); *G10L 15/24* (2013.01); *G10L 15/26* (2013.01); *H04N 5/247* (2013.01); *G06N 20/00* (2019.01); *G06T 3/4046* (2013.01); *G06T 17/00* (2013.01); *G06T 2207/20084* (2013.01); *G06V 40/20* (2022.01); *G10L 13/00* (2013.01)

(56) References Cited

U.S. PATENT DOCUMENTS

| | | | |
|---|---|---|---|
| 5,659,764 | A | 8/1997 | Sakiyama |
| 5,704,012 | A | 12/1997 | Bigus |
| 5,887,069 | A | 3/1999 | Sakou |
| 6,477,239 | B1 | 11/2002 | Ohki |
| 7,027,054 | B1 | 4/2006 | Cheiky |
| 7,702,506 | B2 | 4/2010 | Yoshimine |
| 8,488,023 | B2 | 7/2013 | Bacivarov et al. |
| 8,553,037 | B2 | 10/2013 | Smith |
| 8,751,215 | B2 * | 6/2014 | Tardif ............... G06V 40/28 704/4 |
| 9,305,229 | B2 | 4/2016 | DeLean |
| 9,418,458 | B2 | 8/2016 | Chertok |
| 10,037,458 | B1 | 7/2018 | Mahmoud |
| 10,304,208 | B1 | 5/2019 | Chandler |
| 10,489,639 | B2 * | 11/2019 | Menefee ............... G06F 3/013 |
| 10,924,651 | B2 | 2/2021 | Chaudhri |
| 10,956,725 | B2 * | 3/2021 | Menefee ............... G06V 40/28 |
| 2002/0069067 | A1 | 6/2002 | Klinefelter |
| 2003/0191779 | A1 | 10/2003 | Sagawa |
| 2004/0210603 | A1 | 10/2004 | Roston |
| 2005/0258319 | A1 | 11/2005 | Jeong |
| 2006/0134585 | A1 | 6/2006 | Adaamo-Villani |
| 2006/0204033 | A1 | 9/2006 | Yoshimine |
| 2008/0013793 | A1 | 1/2008 | Hillis |
| 2008/0013826 | A1 | 1/2008 | Hillis |
| 2008/0024388 | A1 | 1/2008 | Bruce |
| 2008/0201144 | A1 | 8/2008 | Song |
| 2010/0044121 | A1 | 2/2010 | Simon |
| 2010/0194679 | A1 | 8/2010 | Wu et al. |
| 2010/0296706 | A1 | 11/2010 | Kaneda et al. |
| 2010/0310157 | A1 | 12/2010 | Kim |
| 2011/0221974 | A1 | 9/2011 | Stem |
| 2011/0228463 | A1 | 9/2011 | Matagne |
| 2011/0274311 | A1 | 11/2011 | Lee |
| 2011/0301934 | A1 | 12/2011 | Tardif |
| 2013/0318525 | A1 | 11/2013 | Palanisamy |
| 2014/0101578 | A1 | 4/2014 | Kwak |
| 2014/0309870 | A1 | 10/2014 | Ricci |
| 2015/0092008 | A1 | 4/2015 | Manley |
| 2015/0317304 | A1 | 11/2015 | An |
| 2016/0196672 | A1 | 7/2016 | Chertok |
| 2016/0267349 | A1 | 9/2016 | Shoaib |
| 2016/0320852 | A1 | 11/2016 | Poupyrev |
| 2016/0379082 | A1 | 12/2016 | Rodriguez et al. |
| 2017/0090995 | A1 | 3/2017 | Jubinski |
| 2017/0153711 | A1 | 6/2017 | Dai |
| 2017/0206405 | A1 | 7/2017 | Molchanov |
| 2017/0236450 | A1 | 8/2017 | Jung et al. |
| 2017/0255832 | A1 | 9/2017 | Jones et al. |
| 2017/0351910 | A1 | 12/2017 | Elwazer |
| 2018/0018529 | A1 | 1/2018 | Hiramatsu |
| 2018/0032846 | A1 | 2/2018 | Yang et al. |
| 2018/0047208 | A1 | 2/2018 | Marin |
| 2018/0101520 | A1 | 4/2018 | Fuchizaki |
| 2018/0137644 | A1 | 5/2018 | Rad et al. |
| 2018/0181809 | A1 | 6/2018 | Ranjan |
| 2018/0189974 | A1 | 7/2018 | Clark |
| 2018/0268601 | A1 | 9/2018 | Rad |
| 2018/0373985 | A1 | 12/2018 | Yang |
| 2018/0374236 | A1 | 12/2018 | Ogata |
| 2019/0026956 | A1 | 1/2019 | Gausebeck |
| 2019/0043472 | A1 | 2/2019 | Garcia |
| 2019/0064851 | A1 | 2/2019 | Tran |
| 2019/0066733 | A1 | 2/2019 | Somanath |

OTHER PUBLICATIONS

Chandler, T. et al. U.S. Appl. No. 16/270,532 Non-final Office Action dated Mar. 28, 2019, (21 pages).

Chandler, T. et al. U.S. Appl. No. 16/258,514 Notice of Allowance dated Mar. 27, 2019, (8 pages).

Chanler, T. et al. U.S. Appl. No. 16/258,531 Notice of Allowance dated Mar. 25, 2019, (8 pages).

Chandler, T. et al. U.S. Appl. No. 16/258,524 Notice of Allowance dated Apr. 23, 2019, (16 pages).

International Application No. PCT/US2019/017299, International Search Report and Written Opinion dated May 31, 2019 (12 pages).

Menefee, M. et al. U.S. Appl. No. 16/270,540, Non-Final Office Action dated Jul. 29, 2019, (9 pages).

Chandler, T. et al. U.S. Appl. No. 16/270,532, Notice of Allowance dated Aug. 12, 2019 (11 pages).

Chandler, T. et al. U.S. Appl. No. 16/505,484, Notice of Allowance dated Aug. 21, 2019, (16 pages).

Menefee, M. et al. U.S. Appl. No. 16/270,540, Notice of Allowance Action dated Nov. 14, 2019 (5 pages).

McLaughlin, Niall et al., "Recurrent Convolutional Network for Video-based Person Re-Identification", Proceedings of the IEEE Conference on Computer Vision and Pattern Recognition (CVPR), 2016, pp. 1325-1334 to (Year: 2016).

Asadi-Aghbolaghi, Maryam et al. "A survey on deep learning based approaches for action and gesture recognition in image sequences" 2017 IEEE 12th International Conference on Automatic Face & Gesture Recognition 2017.

\* cited by examiner

AUTOMATED SIGN LANGUAGE TRANSLATION AND COMMUNICATION USING MULTIPLE INPUT AND OUTPUT MODALITIES

CROSS-REFERENCE TO RELATED APPLICATIONS

This patent document is a continuation of U.S. patent application Ser. No. 16/694,965, filed Nov. 25, 2019, and entitled "AUTOMATED SIGN LANGUAGE TRANSLATION AND COMMUNICATION USING MULTIPLE INPUT AND OUTPUT MODALITIES", which is a continuation of U.S. patent application Ser. No. 16/258,509, filed Jan. 25, 2019, and entitled "AUTOMATED SIGN LANGUAGE TRANSLATION AND COMMUNICATION USING MULTIPLE INPUT AND OUTPUT MODALITIES", which claims priority to and the benefits of U.S. Provisional Patent Application No. 62/664,883 filed on Apr. 30, 2018, entitled "MULTI-APERTURE SIGN LANGUAGE RECOGNITION METHOD AND APPARATUS", and U.S. Provisional Patent Application No. 62/629,398, filed Feb. 12, 2018, entitled "INTERACTIVE AUTOMATED SIGN LANGUAGE TRANSLATION METHOD AND APPARATUS". The entire contents of the before-mentioned patent applications are incorporated by reference as part of the disclosure of this patent document.

TECHNICAL FIELD

This document generally relates devices to enable communications, and more particularly to using multiple modalities for communication that include patterns or gestures.

BACKGROUND

Machine assisted interpersonal communication has simplified both business and personal communications, and has enabled the source and receiver of a communication to be separated in both time and space. Devices for machine assisted interpersonal communication range from the simple answering machine to smartphone-based translation systems that can interpret a language (e.g., French) and translate it into another language for the smartphone user (e.g., spoken or written English).

One specific application of machine assisted interpersonal communication is sign language translation. A sign language (also known as signed language) is a language that uses manual communication to convey meaning, ideas and thoughts, which simultaneously employs hand gestures, movement, orientation of the fingers, arms or body, and facial expressions to convey a speaker's ideas. The complexity of sign language may be captured, in part, by using multiple input and output modalities for its translation and communication.

SUMMARY

Disclosed are devices, systems and methods for using multiple input and output modalities that can be used to capture and process images for various applications, including automated sign language translation and communication.

In one aspect, the disclosed technology may be used to recognize a sign language communicated by a subject. This method includes capturing at least one movement associated with the sign language using a set of visual sensing devices, where the set of visual sensing devices includes multiple apertures oriented with respect to the subject to receive optical signals corresponding to the at least one movement from multiple angles. The method further includes generating digital information corresponding to the at least one movement based on the optical signals from the multiple angles, and collecting depth information corresponding to the at least one movement in one or more planes perpendicular to an image plane captured by the set of visual sensing devices. The above method additionally includes producing a reduced set of digital information by removing at least some of the digital information based on the depth information, generating a composite digital representation by aligning at least a portion of the reduced set of digital information, and recognizing the at least one movement based on the composite digital representation.

In another aspect, the disclosed technology may be used to recognize a sign language communicated by a subject. This method includes capturing at least one hand gesture associated with a movement in the sign language using a set of visual sensing devices, the set of visual sensing devices comprising multiple apertures oriented with respect to the subject to receive optical signals corresponding to the at least one movement from multiple angles, generating digital information corresponding to the at least one hand gesture based on the optical signals from the multiple angles, capturing at least one environmental factor using a set of non-visual sensing devices, combining the digital information with information associated with the at least one environmental factor to improve the recognition of the movement in the sign language.

In yet another aspect, the disclosed technology may be used to recognize a sign language communicated by a subject. This method includes capturing at least one movement associated with the sign language using a set of visual sensing devices, the set of visual sensing devices comprising multiple apertures oriented with respect to the subject to receive optical signals corresponding to the at least one movement from multiple angles, generating digital information corresponding to the at least one movement based on the optical signals from the multiple angles, and recognizing the at least one movement based on the digital information.

In yet another aspect, an apparatus comprising a memory and a processor implements the above-described methods is disclosed.

In yet another aspect, the method may be embodied as processor-executable code and may be stored on a non-transitory computer-readable program medium.

The above and other aspects and features of the disclosed technology are described in greater detail in the drawings, the description and the claims.

DETAILED DESCRIPTION

Figure 1:
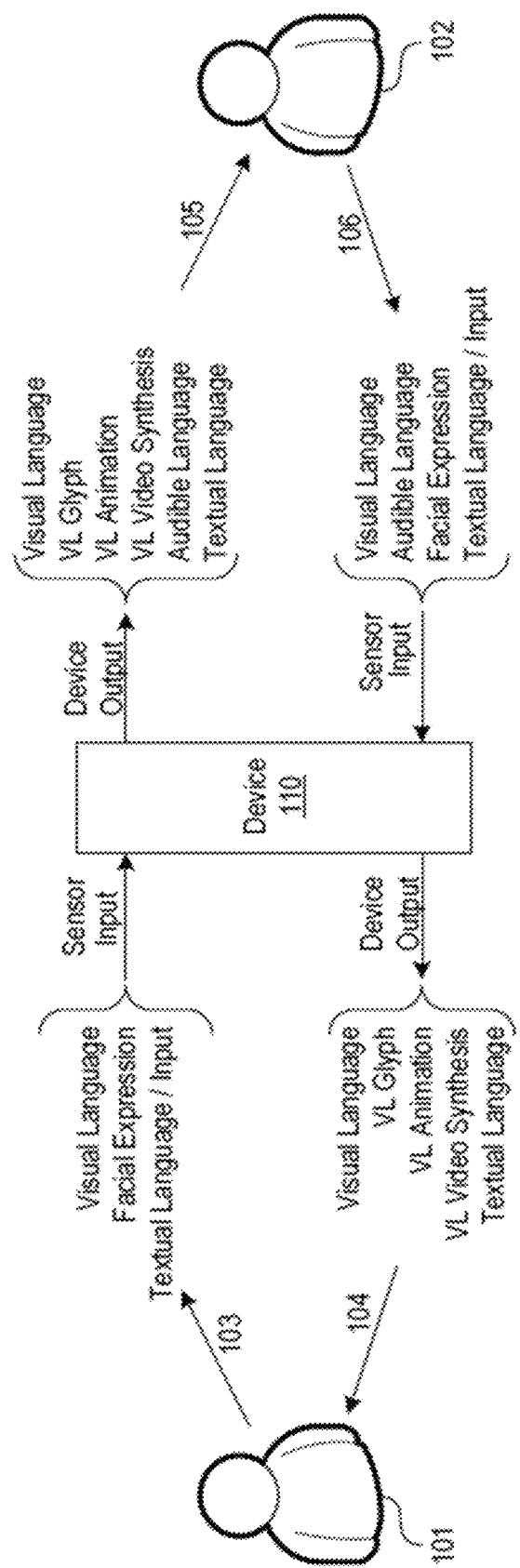
FIG. 1 illustrates a two-way translation system used by two parties in accordance with an example embodiment of the disclosed technology.

Machine-assisted interpersonal communication (or technology-assisted communication) involves one or more people communicating by means of a mechanical or electronic device or devices with one or more receivers. The devices that are used can give the communication permanence (e.g., storage devices) and/or extend its range (e.g., wireless communication) such that the source and receiver can be separated in time and space.

One specific application of using devices for machine-assisted interpersonal communication is sign language communication and translation. Sign languages are extremely complex, and generally do not have a linguistic relation to the spoken languages of the lands in which they arise. The correlation between sign and spoken languages is complex and varies depending on the country more than the spoken language. For example, the US, Canada, UK, Australia and New Zealand all have English as their dominant language, but American Sign Language (ASL), used in the US and English-speaking Canada, is derived from French Sign Language whereas the other three countries sign dialects of British, Australian, and New Zealand Sign Language (collectively referred to as BANZSL). Similarly, the sign languages of Spain and Mexico are very different, despite Spanish being the national language in each country.

Furthermore, unlike spoken languages, in which grammar is expressed through sound-based signifiers for tense, aspect, mood, and syntax, sign languages use hand movements, sign order, and body and facial cues to create grammar. In some cases, even certain uttered sounds or clicks may form a part of the sign language. Such a cue is referred to as a non-manual activity and can vary significantly across different sign languages. It is desirable for a sign-language translation system to capture and process both the hand movements and the non-manual activities to provide an accurate and natural translation for the parties.

Embodiments of the disclosed technology that are implemented for sign language translation are flexible and adaptable in that an input sign language, which can be any one of a several sign languages, is converted to an internal representation, which can then be used to translate the input sign language into one or more of a variety of output sign languages. Furthermore, the embodiments described in this document employ a multiplicity of different sensors and processing mechanisms to be able to capture and process information that may not be obtainable when a single sensor or process is utilized, and to facilitate accurate capture, processing and interpretation of the information to allow translation between different sign languages. In an example, the Bible may be translated from any language to a particular sign language, or from one sign language representation to another, based on the embodiments disclosed in this document. In general, any textual, audible or sign language content may be translated in real-time to corresponding content in another audible, textual or sign language.

FIGS. 1-10 are illustrations offered to provide the proper context for the specific application of a sign language translation system that can benefit from the training techniques described in later sections of this document. FIG. 1 illustrates a two-way translation system used by two parties in accordance with an example embodiment of the disclosed technology. As illustrated in FIG. 1, a device 110 facilitates communication between a first party 101 and a second party 102. The device 110 comprises two sets of sensor inputs and outputs for each of the users. In an example, an outgoing communication of the first party (who may be a sign language user) may be a visual language, a facial expression, or a textual language or input. The device 110 identifies the language used by the first party and translates it into a language understandable by the second party, and outputs it based on a preference of the second party. In another example, as a part of the incoming communication, the device may provide the translated output as a visual language (e.g. another sign language) that may include glyphs, animations or video synthesis (e.g. avatars), or in an audible or textual language.

This process can be inverted by the device in that an outgoing communication of the second party, which now may also be in an audible language, is identified and translated for the first party. The device may output the translation as an incoming communication for the party as a type of visual language or a textual language. The device may input the visual language, audible language, facial expression, or textural language or input as an outgoing communication from the party. In some embodiments, the language choice or preference of either party may be identified by the device. In other embodiments, the language choice or preference may be predetermined or selected in real-time. It is noted that the example system of FIG. 1 allows communications between two sign language users, or a sign language user and a non-sign language user.

Figure 2:
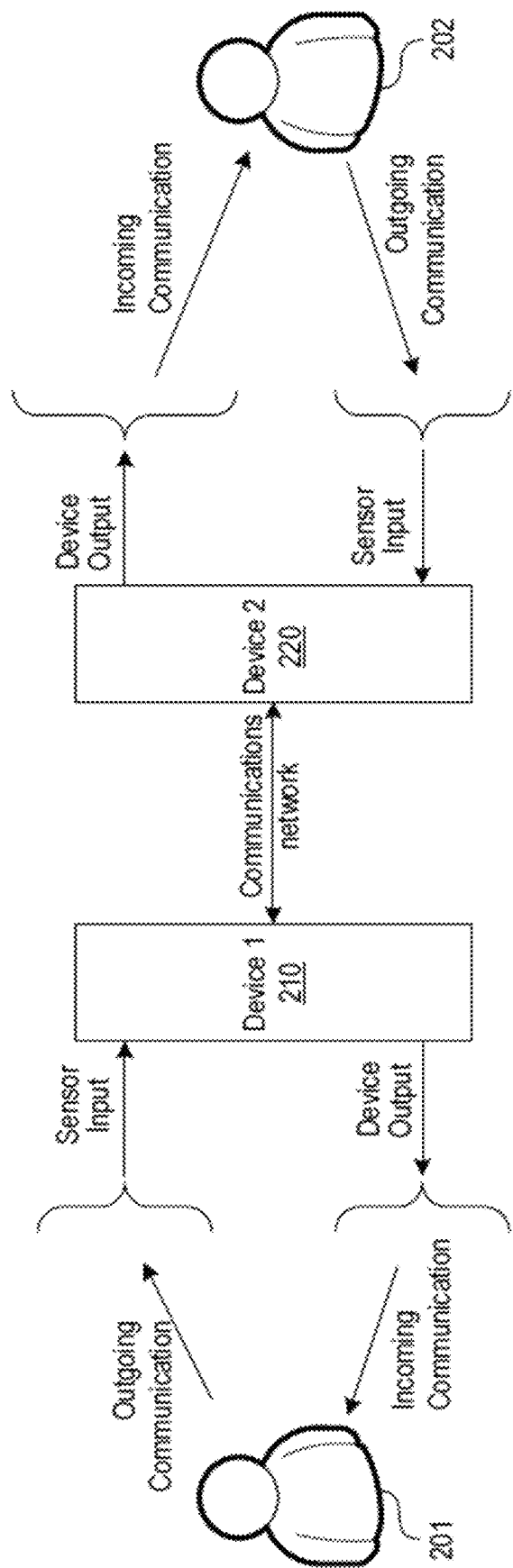
FIG. 2 illustrates a remote two-way translation system used by two parties that may be in different locations over a communication network in accordance with an example embodiment of the disclosed technology.

FIG. 2 illustrates a remote two-way translation system used by two parties that may be in different locations over a communication network in accordance with an example embodiment of the disclosed technology. As illustrated in FIG. 2, the first party 201 and a second party 202 need not necessarily be co-located as long as they have access to a communication network that allows the exchange of information from one location to another location. In the depicted scenario, two devices 210 and 220 are connected via a communication network, which can be a wired network or a wireless network such as a Wi-Fi network, a personal area network, or a mobile network. As in the case of FIG. 1, the remote two-way translation system allows communications between two sign language users, or a sign language user and a non-sign language user.

Figure 3:
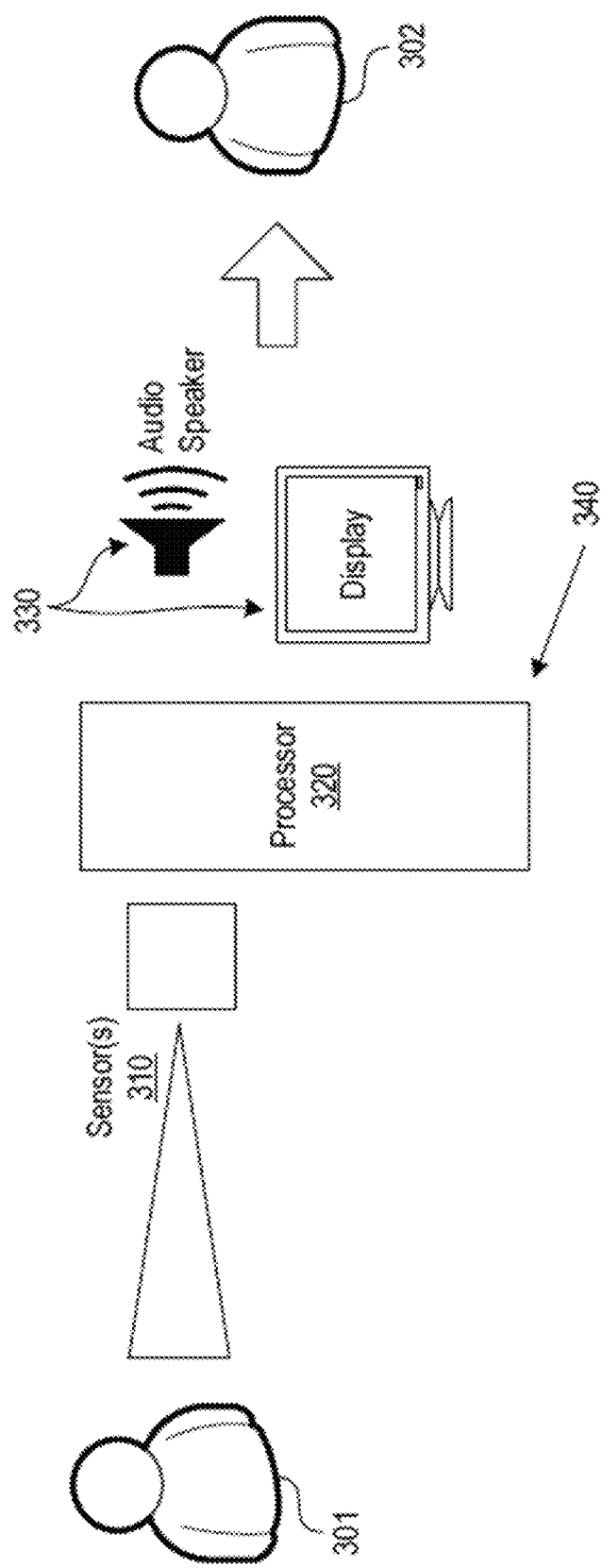
FIG. 3 illustrates a one-way translation system used by two parties in accordance with an example embodiment of the disclosed technology.

FIG. 3 illustrates a one-way translation system used by two parties 301, 302 in accordance with an example embodiment of the disclosed technology. This example includes some features and/or components that are similar to those illustrated in FIGS. 1-2, and described above, and their description is not repeated. As illustrated in FIG. 3, one or more sensors 310 capture one or more aspects of the sign language speaker and/or the speaker's environment and generate a digital representation of what is being observed. As will be described in later sections of this document, the one or more sensors 310 can include a variety of audio, video, motion, haptic and other types of sensors. In some embodiments, the video rate of the sensor data capture may be selected based on the sign language input due to the increased complexity of some sign languages. The digital representation of the sign language communication may include one or more gestures, facial cues, body cues, or environmental factors.

The captured information, including the captured video, is then processed by one or more processors 320 to identify the input sign language, recognize individual gestures and other features of the communication, and translate the communication to an internal representation. The internal representation of the sign language communication can then be converted to an appropriate language and/or format and displayed or audibly output in the language of the second party by various output devices 330, such as displays, speakers, and haptic devices. In some embodiments, the second language may be either a predetermined language or selected by the second party. In other embodiments, a second translation or transformation may be performed if it is detected that certain output devices are not present, or if the user selects an alternate output option.

Figure 4:
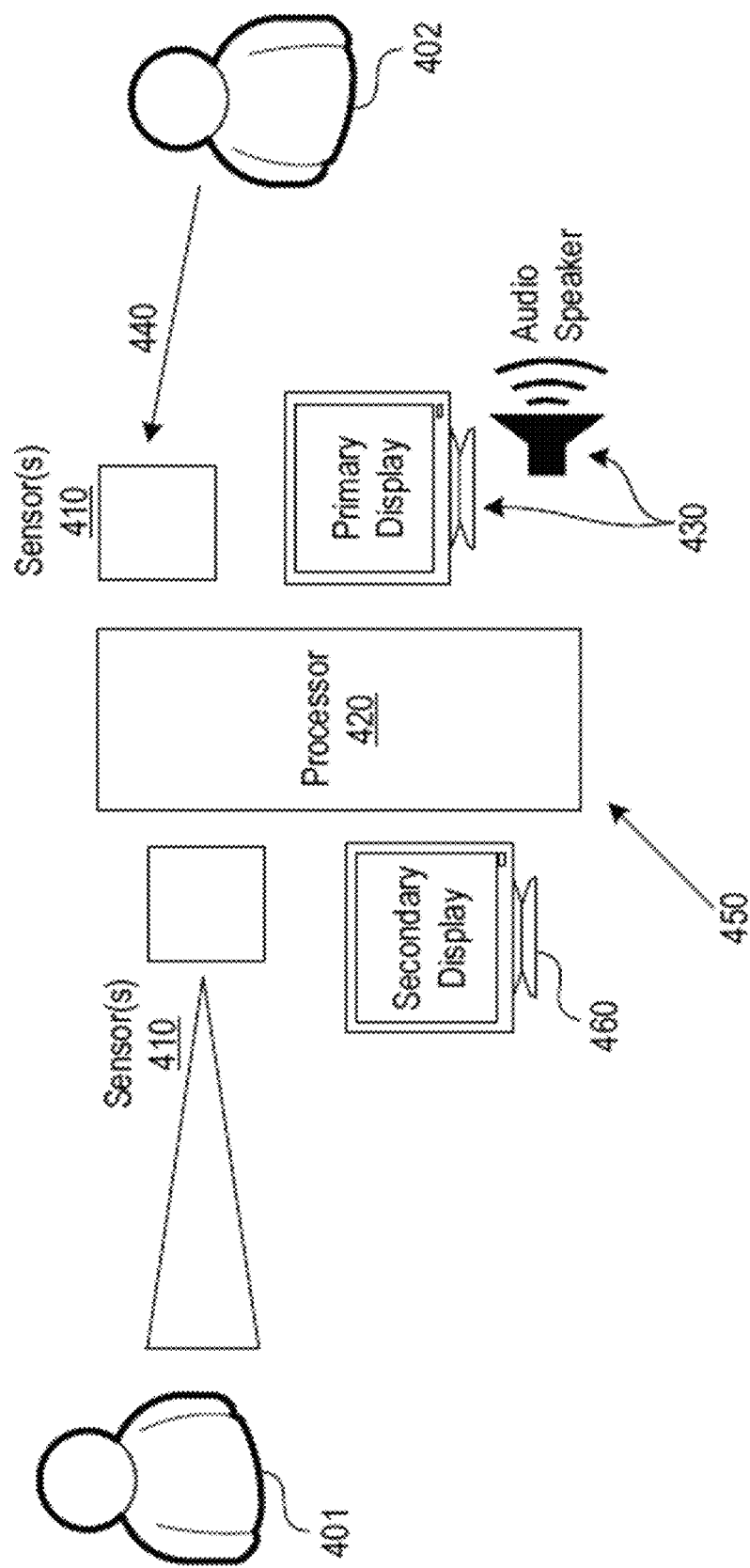
FIG. 4 illustrates another two-way interactive translation system implemented to enable communications by two parties in accordance with an example embodiment of the disclosed technology.

FIG. 4 illustrates another two-way interactive translation system implemented to enable communications by two parties 401, 402 in accordance with an example embodiment of the disclosed technology. As illustrated in FIG. 4, the translation system includes one or more sensors 410, one or more processors 420, and various output devices that are similar to the components described above, and their description is not repeated. In FIG. 4, the one or more sensors 410 are able to receive audible or physical input from the second party 402, who wishes to communicate with the sign language speaker (the first party 401). In some embodiments, the translation system includes additional input interfaces, such as a keyboard or a touchscreen, to receive physical input from the second party 402.

The audible or textual input from the second part is processed by the processor and converted to the internal representation. This internal representation of the second party's communication is then translated to the sign language of the first party 401 and displayed via a secondary display 460. In some embodiments, the first party may receive the input as text, graphic (glyph-like) or through an animated figure representation of the second party. In other embodiments, the two-way translation between a sign language and a textual, audible or different sign language may be performed in real-time.

Figure 5:
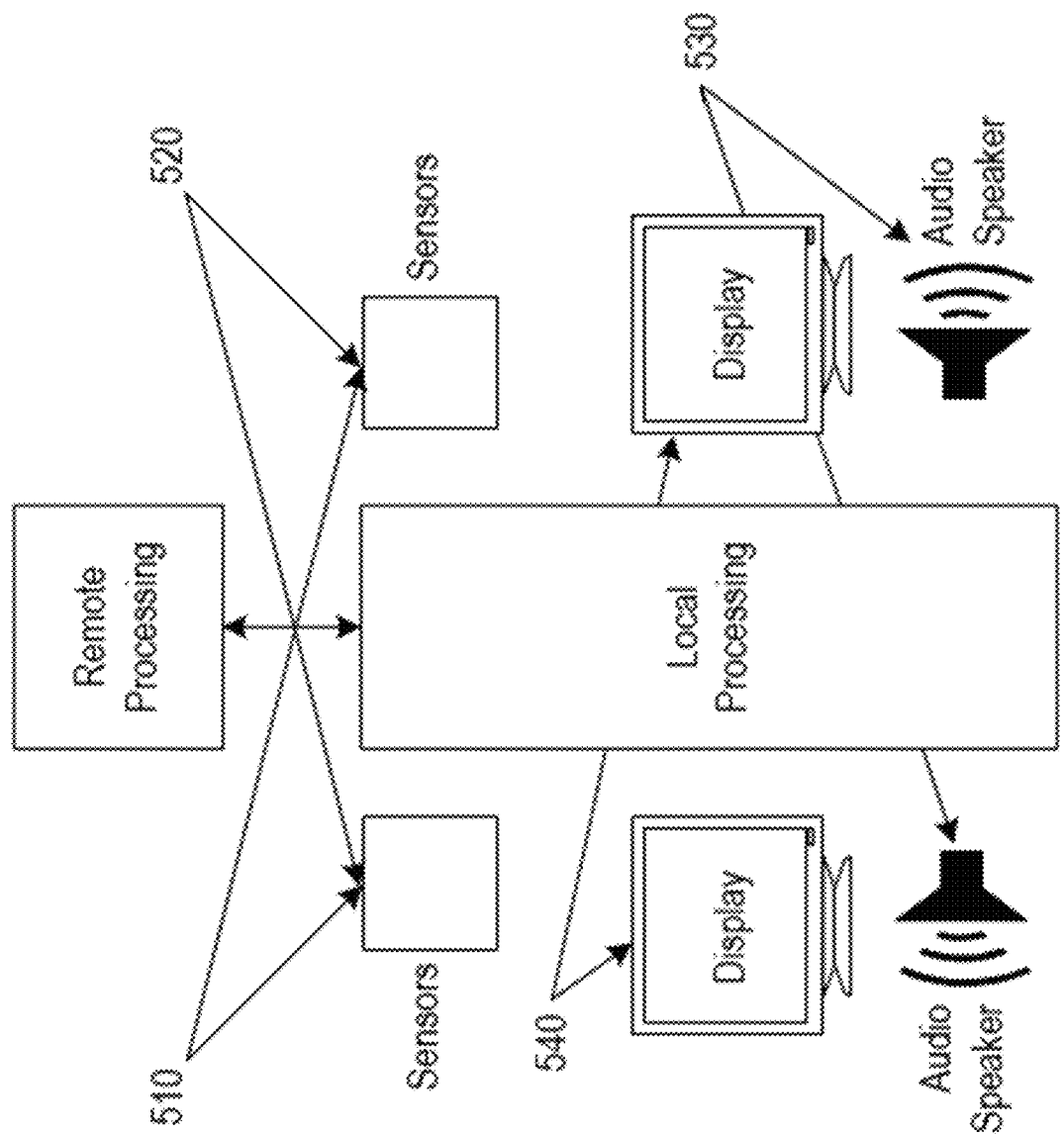
FIG. 5 illustrates a configurable automated translation system in accordance with an example embodiment of the disclosed technology.

FIG. 5 illustrates a configurable automated translation system in accordance with an example embodiment of the disclosed technology. As illustrated in FIG. 5, embodiments of the disclosed technology may include a number of different visual language sensors 510. In an example, the visual language sensors may include one or more of an RGB color camera, a monochrome camera, a 3D stereo camera, structured light emitter, a 3D processor of structured light, a time-of-flight emitter and camera, a non-visual electromagnetic sensor and a non-visual electro-optical sensor. The system may also include standard input devices 520 [Perkins Coie will correct the drawings to include this device], e.g. a microphone, a microphone array or 3D microphone, a touchscreen keyboard, or a physical keyboard.

In addition to the input sensors described above, the device includes a host of output capabilities. For example, standard language rendering may be performed using a textual display 540 or a speaker 530. On the other hand, the sign language output may include textual, graphical (glyphs, etc.), animated (virtual hands, avatars, etc.) or synthesized video (from a library of basic visual language gestures) outputs, which can be demonstrated to the user via another textual display 540 or speaker 530.

FIG. 5 also illustrates that the processing of the input language from the first party, and specifically the translation from an input language to the internal representation and subsequently to the language of the second party, can be performed either locally, remotely or both. In some embodiments, the device may have access to cloud computing resources, which may be leveraged in, for example, configurations where many different output sign languages are to be supported.

Figure 6:
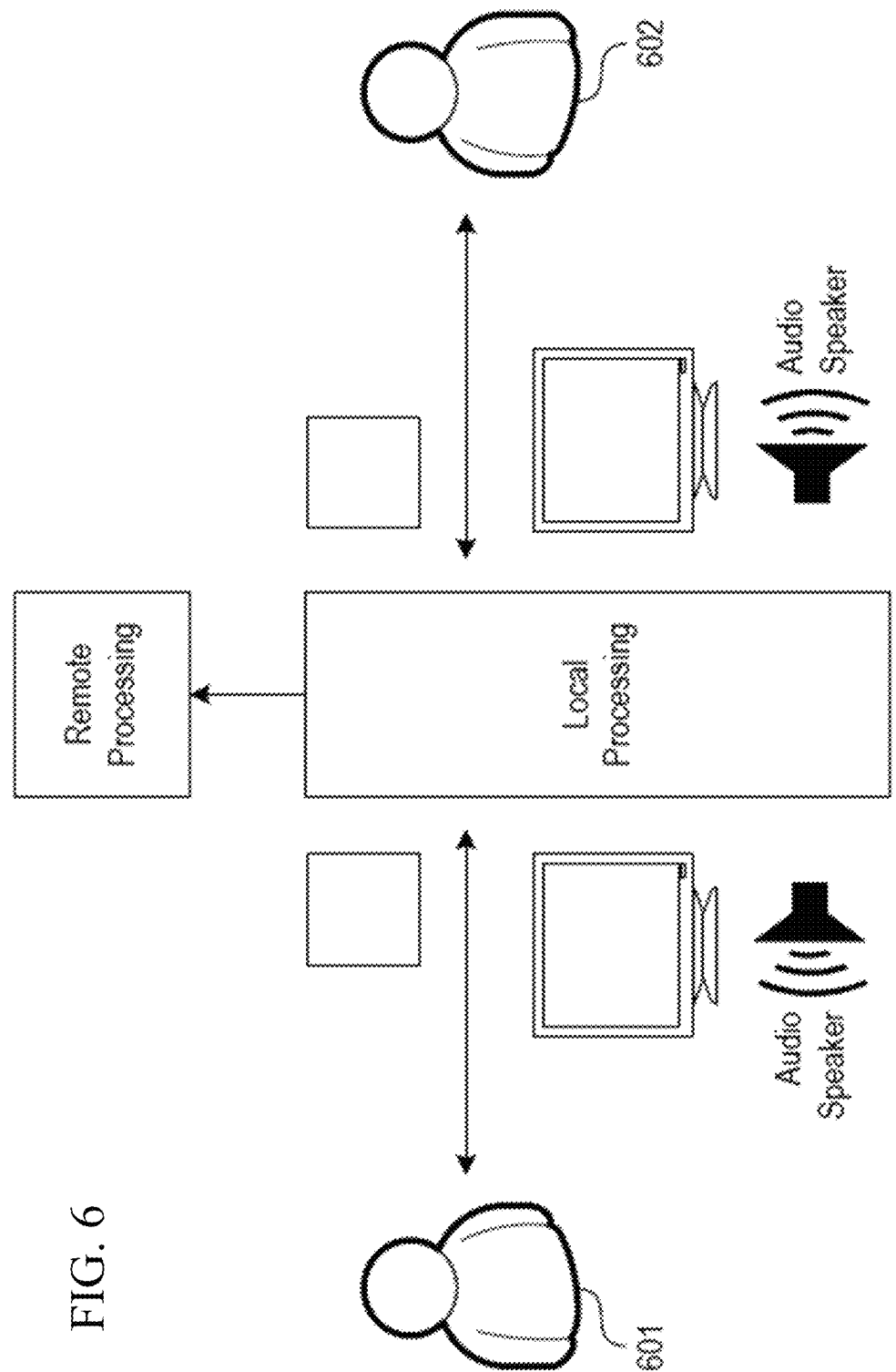
FIG. 6 illustrates another configurable automated translation system in accordance with an example embodiment of the disclosed technology.

FIG. 6 illustrates another configurable automated translation system in accordance with an example embodiment of the disclosed technology. As illustrated in FIG. 6, the translation system includes one or more sensors 610, one or more processors 620, and various output devices that are similar to the components described in the examples above, and the corresponding description is not repeated. In some embodiments, the first party 601 or the second party 602 is not necessarily a person but could be automata. For example, a sign language user may communicate with a virtual assistant, an interactive response agent, or simply an alert generation mechanism. Embodiments of the disclosed technology are flexible and adaptable to be able to support the translation of languages between sign language users, audible language speakers, and automata, and any combination of the above. In part, this is achieved by translating the input language to an internal representation, and then translating it to the required one or more output languages.

In an example, the Bible may be translated into American Sign Language (ASL) which is one of the most commonly used sign languages. Expert input, e.g. interpretation and context for specific verses or sections, may be used to improve the translation during the training period. The ASL-translated Bible may be then displayed using an avatar in a less commonly used sign language that is not ASL. In some embodiments, both the first and second parties may be sign language users, and furthermore, may not use the same sign language.

Figure 7:
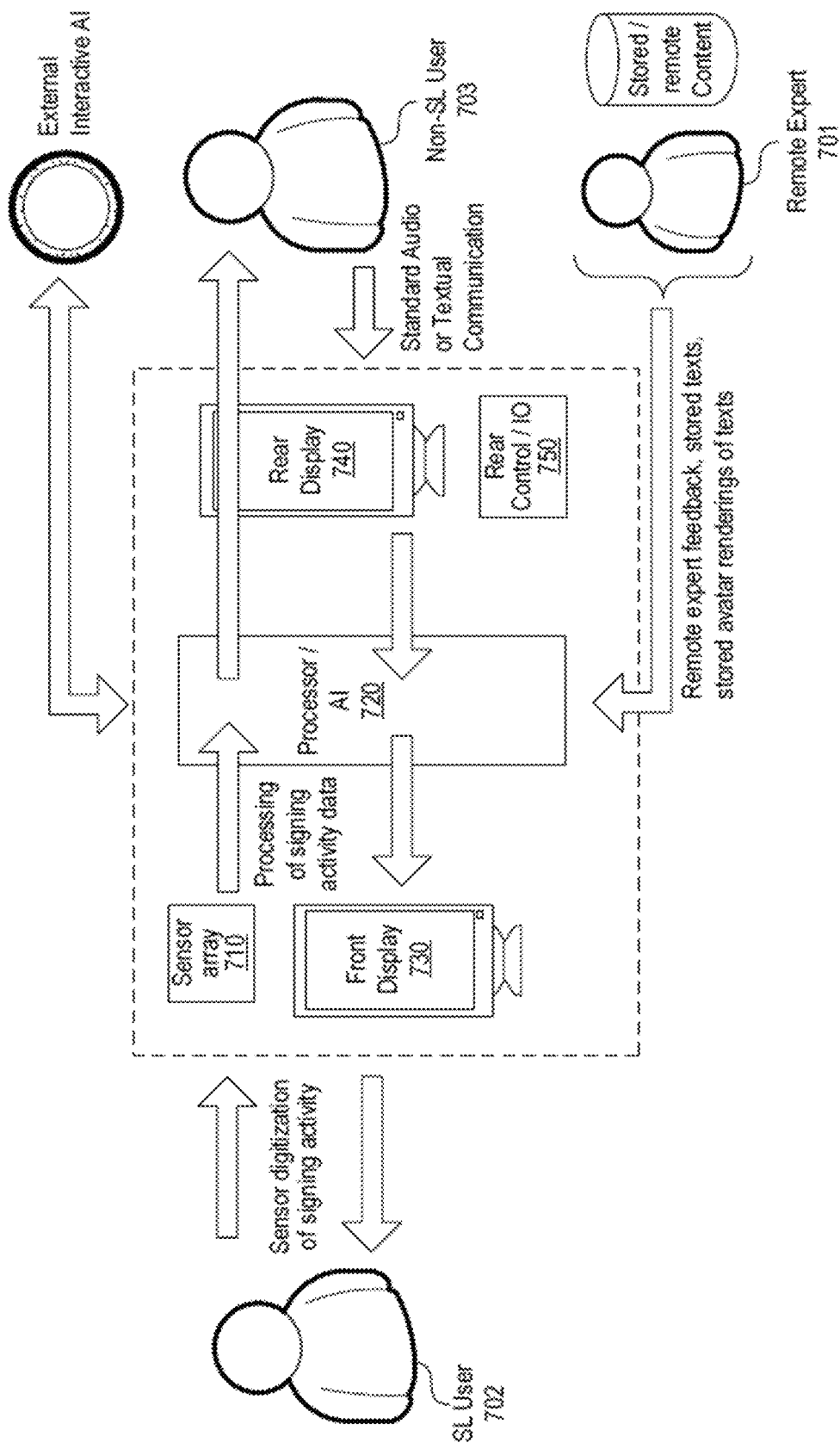
FIG. 7 illustrates yet another configurable automated translation system in accordance with an example embodiment of the disclosed technology.

FIG. 7 illustrates yet another configurable automated translation system in accordance with an example embodiment of the disclosed technology. The automated sign language translation system can be used to translate specific literature or material, e.g. the Bible or works by a particular author. In these scenarios, a remote expert 701 may provide additional context and insight as part of the automated translation process. For example, idiomatic and situational context related to specific content may be used in the training of the neural network and may result in a more natural and useful translation into one of many sign languages.

FIG. 7 illustrates, in part, the digitization of signing activity that is received using a number of sensors 710 that can sense signing activities of a user who uses sign language(s) (also referred to as an SL user 702). The captured data is then fed to one or more processors 720 for processing. Due to the complexity of sign language, and in an effort to support many sign languages, the amount of data that is captured may be prohibitive. Thus, embodiments of the disclosed technology may leverage data that has previously been captured and digitized to reduce the amount of data that needs to be stored when the device is being used in real-time, either locally or in a remote setting. The device then outputs textual or avatar rendering of communication or content to the SL user via the front display 730 of the device.

The device can also include a rear display 740 to show textual or audio communication or content to a user that does not use sign languages (also referred to as a non-SL user 703). The device can receive standard audio or textual communication from the non-SL user and may include a rear control 750 for the non-SL user 703 to control the device.

In some embodiments, the device may be effectively used to perform sign language translations in a remote region, where access to studios and/or more sophisticated computer technology is non-existent or very limited. In an example, a basic corpus of a sign language that is used in a remote area may be used to initially train the neural network and will allow translations upon arrival to that region. After the system is deployed there, the corpus may be expanded exponentially based on input by native sign language users, which will improve the translation capabilities due to iterative training and interpretation (or execution) cycles of the neural network.

Figure 8B:
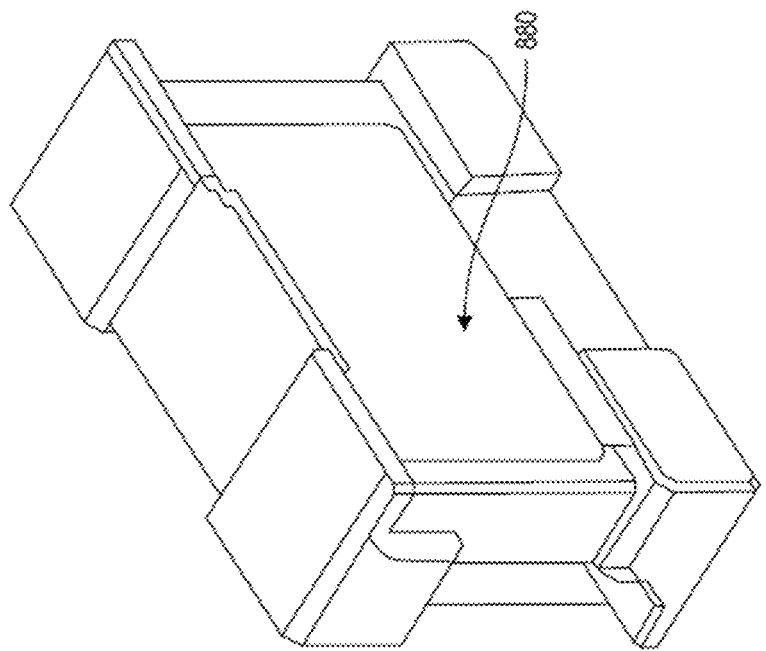
FIG. 8B illustrates another view of an image capture and processing device that can be used for automated sign language translation in accordance with an example embodiment of the disclosed technology.
Figure 8A:
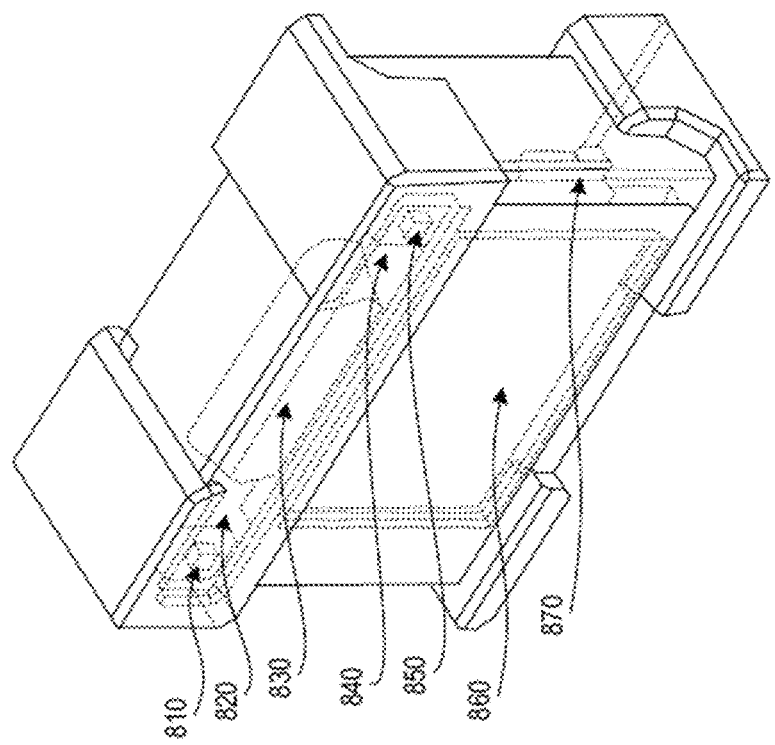
FIG. 8A illustrates one view of an image capture and processing device that can be used for automated sign language translation in accordance with an example embodiment of the disclosed technology.

FIGS. 8A and 8B illustrate different views of an image capture and processing device that can be used for automated sign language translation in accordance with an example embodiment of the disclosed technology. As illustrated in FIG. 8A, the image capture and processing device may include a right camera 810 and a left camera 850 to be able to capture a moving object or scene (e.g., a sign language speaker) from different points of view, therein increasing the depth of field measurements that enable more accurate interpretation of the scene such as the sign language gestures. Similarly, the inclusion of a right microphone 820 and a left microphone 840 enable different contextual and environmental cues to be captured.

The image capture and processing device further comprises stereo (or 3D) camera 830, a front display 830, and one or more processors 870. In some embodiments, the one or more processors include an ARM Cortext-M3 processor and at least one graphics processing unit (GPU). In other embodiments, and as illustrated in FIG. 8B, the device may further comprise a rear display 880, which may be a touchscreen display. In some embodiments, the stereo camera 830 may be replaced or augmented by a depth sensor or multi-aperture camera, which may be configured to measure the "depth" or distance from the camera focal baseline to the object corresponding to a particular pixel in the scene.

Figure 9:
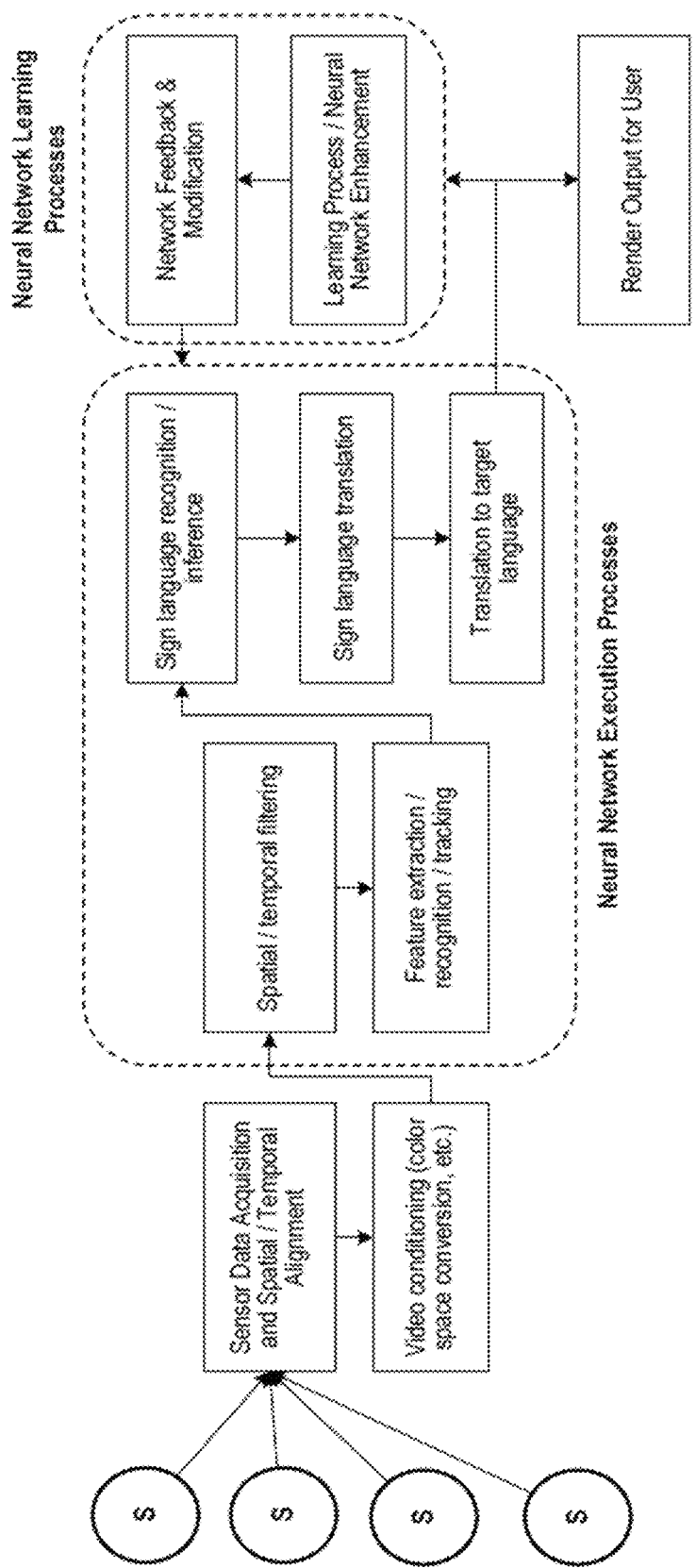
FIG. 9 illustrates a flow diagram of operations that can be carried out by various component to implement automated sign language translation in accordance with an example embodiment of the disclosed technology.

FIG. 9 illustrates an example flow diagram of operations that can be carried out by various component to implement automated sign language translation in accordance with one or more embodiments of the disclosed technology. This example includes some features and components that are similar to those described above, and their description is not repeated.

As illustrated in FIG. 9, multiple sensors 910 may each capture a communication of a sign language user. In an example, using multiple sensors enables environmental factors to be acquired, and provides better depth of field measurements of sign language gestures. In some exemplary operations, a set of preprocessing operations can be performed. For example, the input data collected from the multiple sensors is first aligned, both spatially and temporally. For example, based on the video quality and the external lighting and other conditions, video conditioning procedures (e.g. color space conversion) may be implemented. This operation may be followed by spatial and temporal filtering to, for example, reduce the data to a particular resolution, retain data for only a particular spatial zone of interest or a temporal period of interest. The processing may further include the application of image and/or video processing methods, e.g. edge detection, which conditions the data for additional processing.

The conditioned data of the communication from the sign language user can then be processed in order to extract features of gestures, facial cues and body cues, amongst other features that enable the identification of the sign language. The input sign language is translated to an internal representation, and subsequently translated to the target language. The output is then rendered to the user.

In some embodiments, the feature extraction, identification and translation may be part of a neural network execution process. Before the neural network starts the execution process, the neural network is trained by the neural network learning process. The techniques discussed in later sections of this document can be implemented in the neural network learning process to allow the trained neural network to recognize a large number of characteristics in the input data more efficiency and more accurately. To perform the neural network learning process, a set of training data can be used to carry out training algorithms such as supervised training of the neural network. In some embodiments, as part of feedback for the learning process, the translated sign language is used to further train and modify the neural network to improve its identification and translation capabilities. In yet other embodiments, reinforcement training of neural networks may be employed to improve performance and increase the flexibility and adaptability of embodiments of the disclosed technology.

Figure 10:
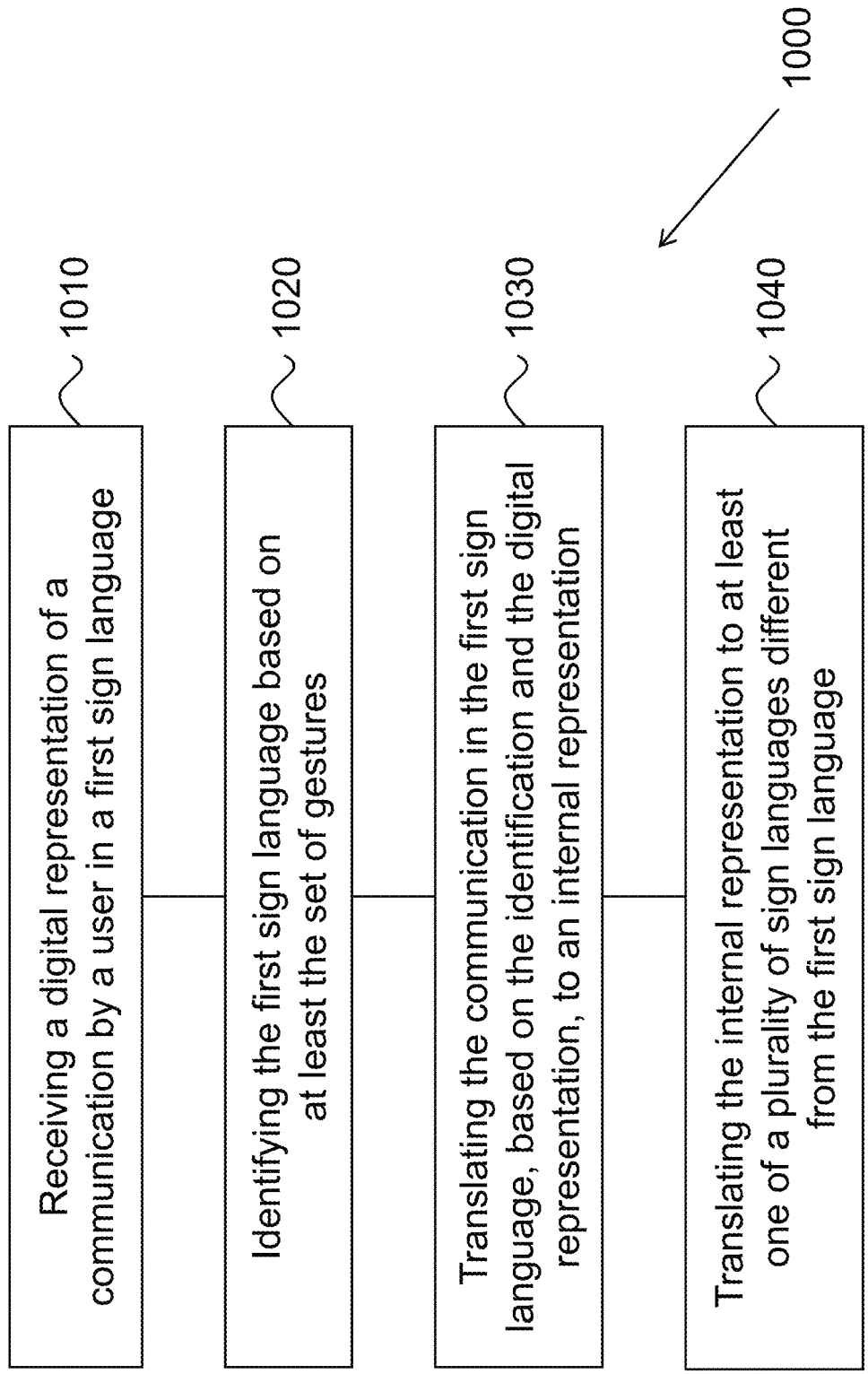
FIG. 10 illustrates a method that includes a set of operations that can be carried out to automate sign language translation in accordance with an example embodiment of the disclosed technology.

FIG. 10 illustrates a method 1000 that includes a set of operations that can be carried out to automate sign language translation in accordance with an example embodiment of the disclosed technology. The method 1000 includes, at operation 1010, receiving a digital representation of a communication by a user in a first sign language. In some embodiments, the digital representation includes a plurality of images. In other embodiments, the digital representation includes a video recording.

The method 1000 includes, at operation 1020, identifying the first sign language based on at least the set of gestures. In some embodiments, identifying the first sign language may be based on a sign language gesture library or sign language content curated by an expert. In an example, the expert content may comprise idiomatic and situational context associated with the first sign language.

The method 1000 includes, at operation 1030, translating the communication in the first sign language, based on the identification and the digital representation, to an internal representation. The method 1000 includes, at operation 1040, translating the internal representation to at least one of a plurality of sign languages different from the first sign language. In some embodiments, the translation may be based on sign language content curated by an expert. For example, and when translating known subject matter (e.g. the Bible) the expert content may be based on existing interpretation and analysis.

In some embodiments, the method may further include receiving a response to the communication, which is translated into the internal representation, and subsequently into the first sign language. Embodiments of the disclosed technology are capable of real-time operation, which is enabled, in part, by the internal representation and the underlying neural network.

As noted earlier, the example configurations in FIGS. 1-10 represent examples of systems that capture a variety of information (e.g., video, audio, still images, etc.) in different modalities (e.g., natural light, structured light, infrared light) of moving and still objects, as well as of the background environment. As a result, a large amount of data is obtained to undergo further processing and analysis to extract the information of interest. Generation and analysis of large amounts of data are hallmarks of other systems and applications, such as autonomous vehicles and medical applications that involve analysis of medical images (e.g., MM, X-ray, CT scan, video content, etc.). Additional applications include, but are not limited to, interactive video games, airport security and surveillance applications, analysis and training for various sports, interactive home devices, and others.

In some embodiments, the example configurations in FIGS. 1-10 can include a device that supports multiple modalities in order to capture the complexities and nuances of sign language for its communication and translation.

Figure 11:
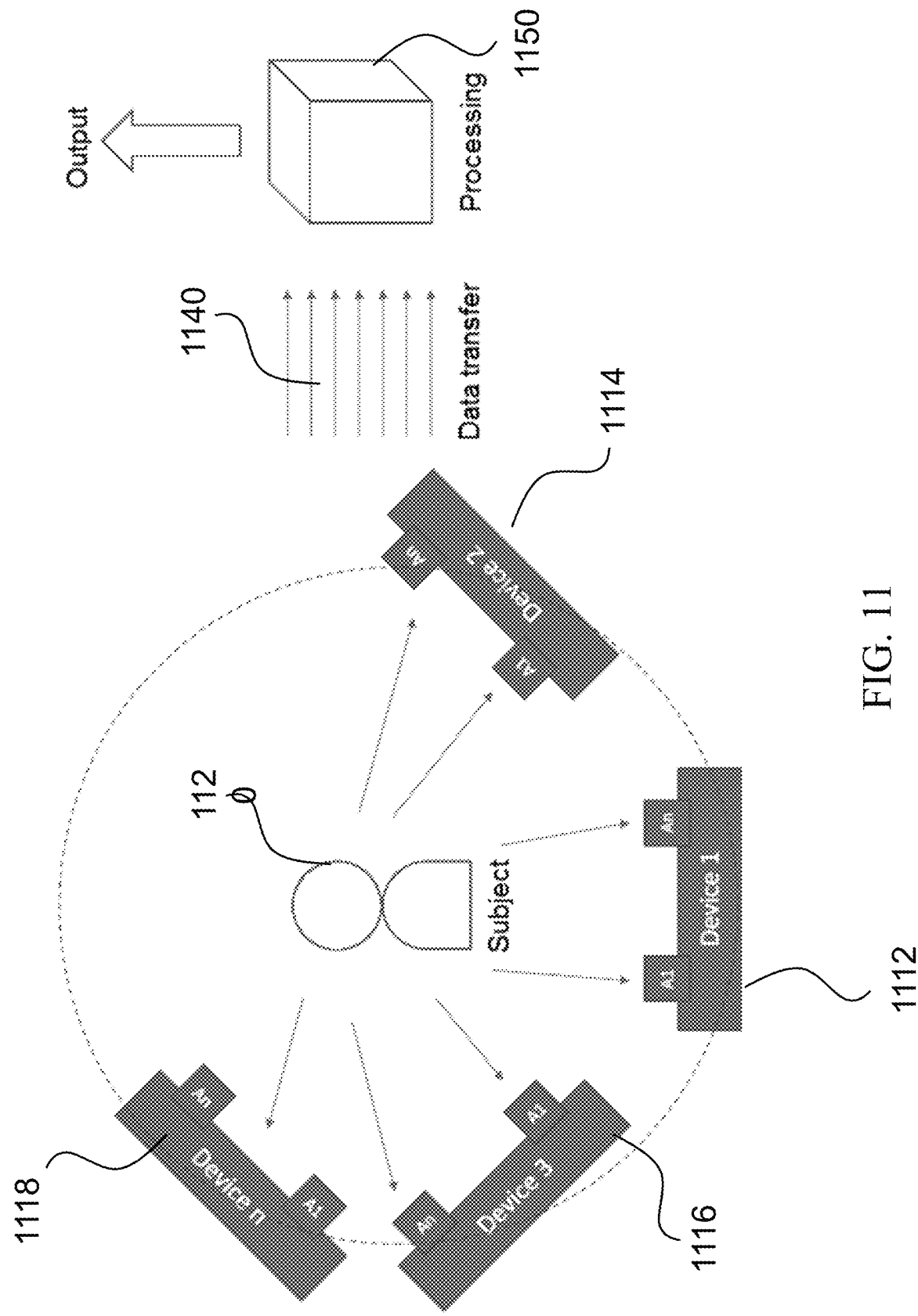
FIG. 11 illustrates an example system for sign language recognition using a device with multiple input and output modalities.

FIG. 11 illustrates an example system for sign language recognition using multiple input and output modalities. As illustrated therein, a number of devices (Device 1, Device 2, . . . Device n, denoted 1112, 1114, . . . 1118, respectively) each include multiple apertures (A1, . . . An) that are arranged around the subject 1120. The orientation of the devices and apertures ensure that the nuances of movements of the sign language being communicated by the subject are captured. In an exemplary implementation, the multiple apertures are arranged so as to cover multiple angles (and perspectives) of the subject and in different spatial planes. In other words, the multiple apertures are not all aligned on the same horizontal or vertical axis.

In an example, each of the devices (1112, 1114, 1116, 1118) illustrated in FIG. 11 typically use an approximately 90° horizontal field-of-view (HFOV), and they are generally oriented by less than half the field-of-view in camera disparity applications (which refers to the use of multiple apertures to capture the same subject). Based on sampling and interferometric considerations, a system with three devices may have a first camera facing the subject head-on, a second camera 90° to one side, and a third camera 45° to the other side. In one exemplary system, these three cameras may be placed in a single horizontal plane. In another exemplary system, the second or the third camera may be positioned at an elevated position of 25-30° above the plane of the other two cameras. In yet another exemplary system, a fourth camera may be placed at an elevated position with respect to the plane.

In some implementations of the disclosed technology, one or more of the devices illustrated in FIG. 11 may be a special type of camera that projects a pattern of light (e.g., through a holographic diffuser) in the Near IR region (~850 nm, which is invisible to humans), and which is detected by a silicon focal plane array (FPA). This advantageously enables depth information to be captured in higher detail as compared to using pure stereoscopic imaging. This framework is typically referred to as a "structured light" camera. In this configuration, the projection "aperture" of the structured light can be mounted to a rigid structure with the stereo apertures to ensure consistent alignment with the cameras and visible camera video can then be combined with the depth information.

By using multiple apertures (or equivalently, multiple input and output modalities) on a single device, and/or multiple multi-aperture devices, a more complete 3D model of a video scene can be captured in real time with enough fidelity to enhance the performance of algorithms acting on the data.

The use of multiple apertures results in the capturing of additional information that cannot be not captured using existing technologies. For example, a conventional camera records light intensity from a single point-of-view, and typically using a single aperture. In another example, a light-field camera captures information about the light field emanating from a scene; e.g., the intensity of light in a scene, and also the direction that the light rays are traveling in space. Light-field cameras are well-suited for static images (or scenes) and enable refocusing the image after the image has been taken.

In contrast to conventional technologies, implementations of the disclosed technology capture an increased amount of information for the same pixel using different cameras and apertures. For example, each camera of a plurality of cameras can capture a different view of the same movement by the subject. While the disclosed devices can be readily equipped with optical elements that can perform focusing in the traditional sense, in one example, this increased amount of information (in an information theory sense) is captured without any refocusing considerations. As such, the captured data includes information that can be used on an as-needed basis. For example, if there is a need to provide a higher resolution image of a particular segment of the captured object, or to analyze a particular motion from different angles, such information can be readily extracted from the captured data. Further note that this increased amount of information becomes increasingly more important to capturing motion, as compared to static images.

In some examples, each of the devices in FIG. 11 may be a single-FPA that is capable of capturing depth information for an image or a frame of a video. Implementations of the disclosed technology may use imaging chips capable of sensing the phase angle of an incident ray on a single pixel with no requirement of a corresponding multi-pixel lenslet. In other words, the devices illustrated in FIG. 11 may effectively sample the quadrature phase information of incoming electrometric radiation (e.g., light) thereby capturing depth information on a per-pixel basis. The use of one or more single- and multiple-aperture visual sensing devices to capture a movement of a sign language from different angles to subsequently enable robust and accurate identification of the movement is one of the capabilities of the disclosed technology.

As illustrated in FIG. 11, the digital representation of the movements of a sign language communicated by the user are transferred (e.g. using a data transfer module 1140) to a processing module 1150. Some implementations may include additional processing and/or hardware capabilities for pre-processing, time-aligning and post-processing the different views of the subject, and subsequently interpreting them to identify the movement communicated by the subject.

For example, each device illustrated in FIG. 11 may include an ARM processor running a variant of the Linux operating system, which may be used for the pre- and post-processing operations of the disclosed methods. The pre- and post-processing operations may include filtering, transforming and other image processing operations. In some implementations, the processing of the video and images through an artificial intelligence (AI)-based deep neural network (DNN) or convolutional neural network (CNN) may be performed on-board, prior to the off-platform transform.

More generally, numerous video processing operations, including but not limited to timestamping, decoding/encoding, color space conversion, de-Bayering, and other signal and/or image processing, may be performed using on-board GPU hardware in the device.

In an example, aligning the digital representations captured using the multiple apertures in the temporal domain may be implemented using a GPS (Global Positioning System) 1 PPS (pulse-per-second) signal or a network-based time service (e.g. NTP (Networking Time Protocol) or SMPTE timecodes. In an example, the camera clocks may be synchronized using NTP or the 1 PPS signal.

In other examples, the clocks for both the active and passive cameras in the system are synchronized locally via a common clock signal based on the support of the individual hardware devices. Some cameras may directly link their clock signals, but most commonly a frame integration pulse is used, either rising and falling at the start of the frame, or staying high through the integration duration, and then falling low during readout. Typically, the focal plane array (FPA) manufacturer (e.g., Sony, ON, Aptina, etc.) specifies the compatible pin signals for clock synchronization. This signal synchronizes the clocks locally, and can then be synchronized globally either through the network, and/or via 1 PPS or greater GPS sync lines from an on-board GPS receiver. Commonly, a GPS device is used in concert with the NTP software to provide distributed timing information to networked devices, which then "slew" their timing signal to match the reference, resulting in synchronized frame captures throughout the networked devices. In some embodiments, the networked devices include multiple input modalities, e.g. a depth-field camera, a sound sensor and an infra-red (IR) camera. For example, the clocks in each of the modalities may be synchronized based on the PPS or GPS signals.

In certain scenarios, the system may not necessarily require the data from all apertures to be registered or consolidated prior to processing. For example, the processing algorithms may process multiple camera feeds from multiple angles independently. While a single camera with one aperture may be sufficient for the recognition of a simple sign corresponding to a single letter, e.g., "A," a sign involving motion would necessitate multiple apertures to be recognized accurately. Furthermore, reading the "emotion" of the subject may require facial analysis from a completely independent data stream than the one used to identify the sign language movements. Implementations of the system may beneficially make the independent data streams available in both raw and processed formats, so that various (and very different) algorithms may be used to robustly and accurately interpret sign language. In one example, the OpenPose library may be used to implement facial recognition algorithms. In another example, algorithms that could be used for facial recognition may include principal component analysis using eigenfaces, linear discriminant analysis, elastic bunch graph matching using the Fisherface algorithm, the hidden Markov model, the multilinear subspace learning using tensor representation, and the neuronal motivated dynamic link matching. Thus, the accuracy of results may be improved by including unique information, which is not possible to observe except through implementations of the disclosed technology.

Figure 12:
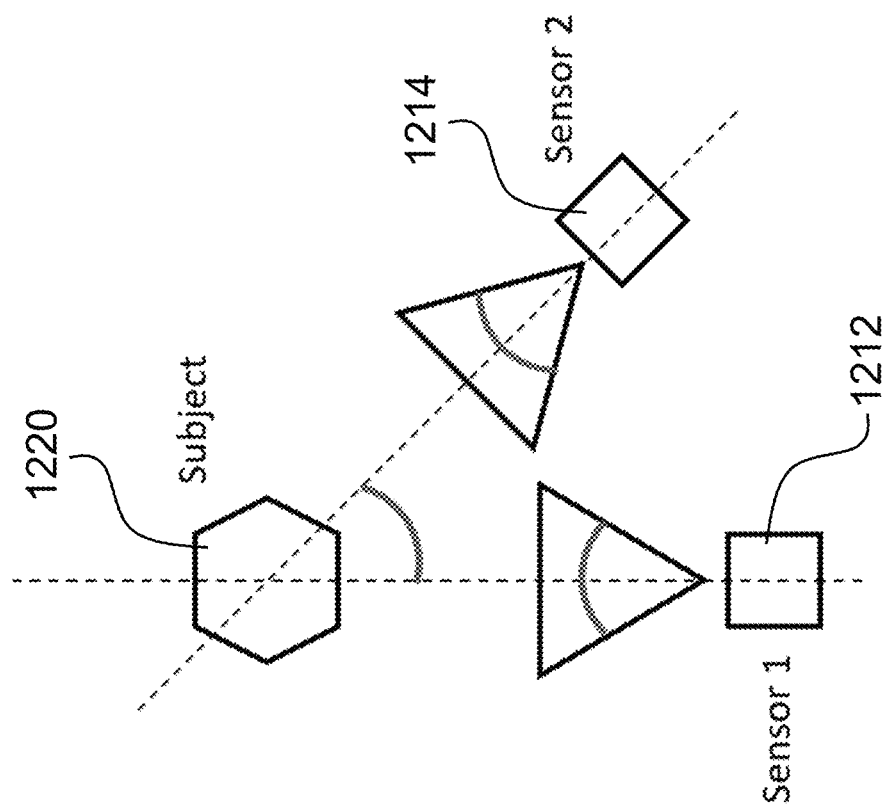
FIG. 12 illustrates another example system for sign language recognition using a device with multiple input and output modalities.

FIG. 12 illustrates another example system for sign language recognition using a device with multiple input and output modalities. As illustrated therein, two sensors (Sensor 1 and Sensor 2 denoted 1212 and 1214, respectively) are arranged to ensure that nuances of sign language movements by the subject 1220 are captured in order to increase the recognition capabilities of the subsequent processing algorithms. In an example, two sensors may be arranged with a 4° field-of-view (FOV) overlap. As illustrated in FIG. 12, the two sensors are arranged to provide a 45° FOV with an angular separation of (45−2×4)=37° angular separation.

In alternate implementations, the desired FOV overlap may be computed for multiple devices, and as discussed above, may be implemented such that the devices are not aligned along the same horizontal or vertical axis. In general, the more the data collected by each sensing device differs, the richer the overall data set after processing will be. Furthermore, and in the context of being able to interpret the different nuances of sign language (e.g., movement, emotion, etc.), the different feeds from each of the multiple sensing devices can be processed by different algorithms. Having overlapped pixels (or more generally, information) from each device enables their alignment after possibly disparate processing, and results in accurate and robust interpretation of signed language.

For example, one set of visual sensing devices can capture information related to the movements of the sign language being performed by a subject's hands, which is processed by an AI-based DNN or CNN to interpret its meaning. Additionally, a different set of visual sensing devices can capture information related to the movement of the eyebrows, gaze direction and blinks of the subject, which is processed by facial recognition algorithms. In an example, the subject may look upward when indicating a hypothetical statement. Thus, implementations of the disclosed technology are able to align and combine disparately processed results to provide more accurate interpretations of the subject's thoughts and meanings.

In some embodiments, the Sensor 1 and Sensor 2 may be implemented using the exemplary device illustrated in FIGS. 8A and 8B. Referring back to FIGS. 8A and 8B, the device illustrated therein may include a depth sensor that may advantageously augment the amount of information collection for signal language recognition, and which may be configured to measure the "depth" or distance from the camera focal baseline to the object corresponding to a particular pixel in the scene.

In a first example, the depth sensor may operate using structured light projections that are based using a light source to project a known pattern, and using a receiver to detect the distortion of the reflected pattern to calculate a depth map based on geometry. This approach can produce very accurate depth measurement results, but can be computationally expensive. Furthermore, structured light projections are sensitive to environmental brightness, and are typically used in dark or indoor areas.

In a second example, the depth sensor may operate based on the time-of-flight (ToF) approach that relies on a light source to send out a pulse and a sensor to detect that pulse's reflection off the target object to record it's time of flight. The ToF-based depth sensor may be implemented using a short pulse to provide very accurate (and more expensive) results, or it may use a modulated pulse and detect a phase change, which provides less accurate (but much cheaper) results.

The use of a depth sensor (or equivalently, depth information obtained from one or more apertures of one or more sensing devices) advantageously enables filtering out data that is not related to the sign (e.g., the gesture formed by the signer) itself. For example, the gesture/movement recognition algorithms can be used to remove unrelated or unnecessary pixels from the image that are not within a desired depth range. Additionally, a "3D" framework for the movement may be established using the depth information, so as to be able to detect nuances in not only the image plane, but even in planes that are perpendicular to the image plane.

Figure 13A:
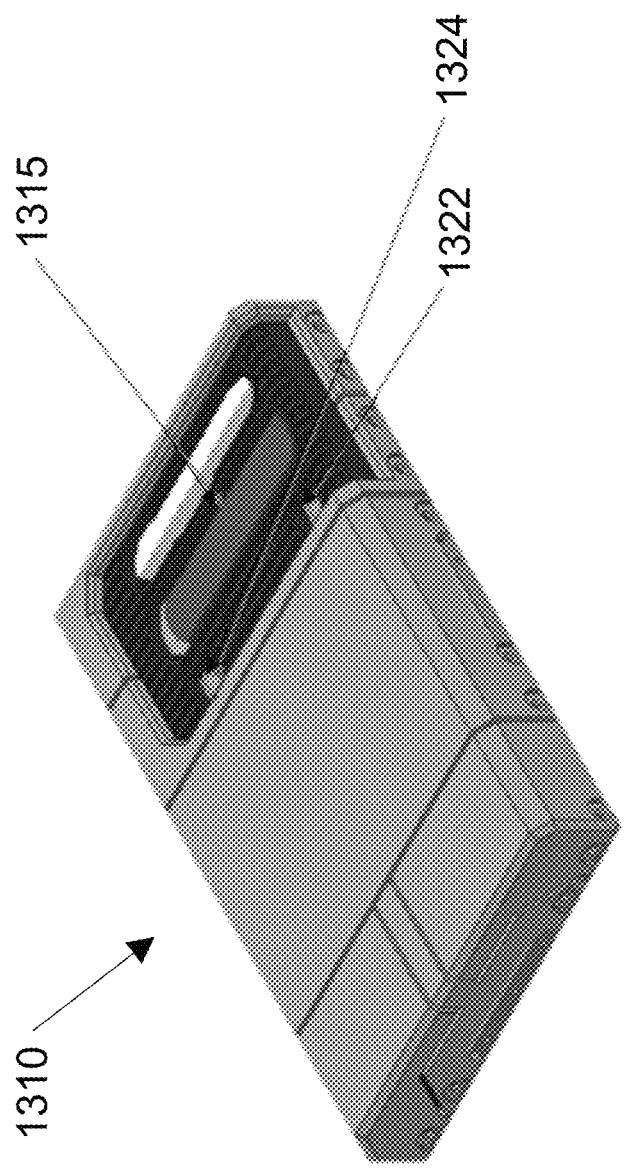
FIGS. 13A, 13B and 13C illustrate an example device for sign language recognition using a device with multiple input and output modalities.
Figure 13B:
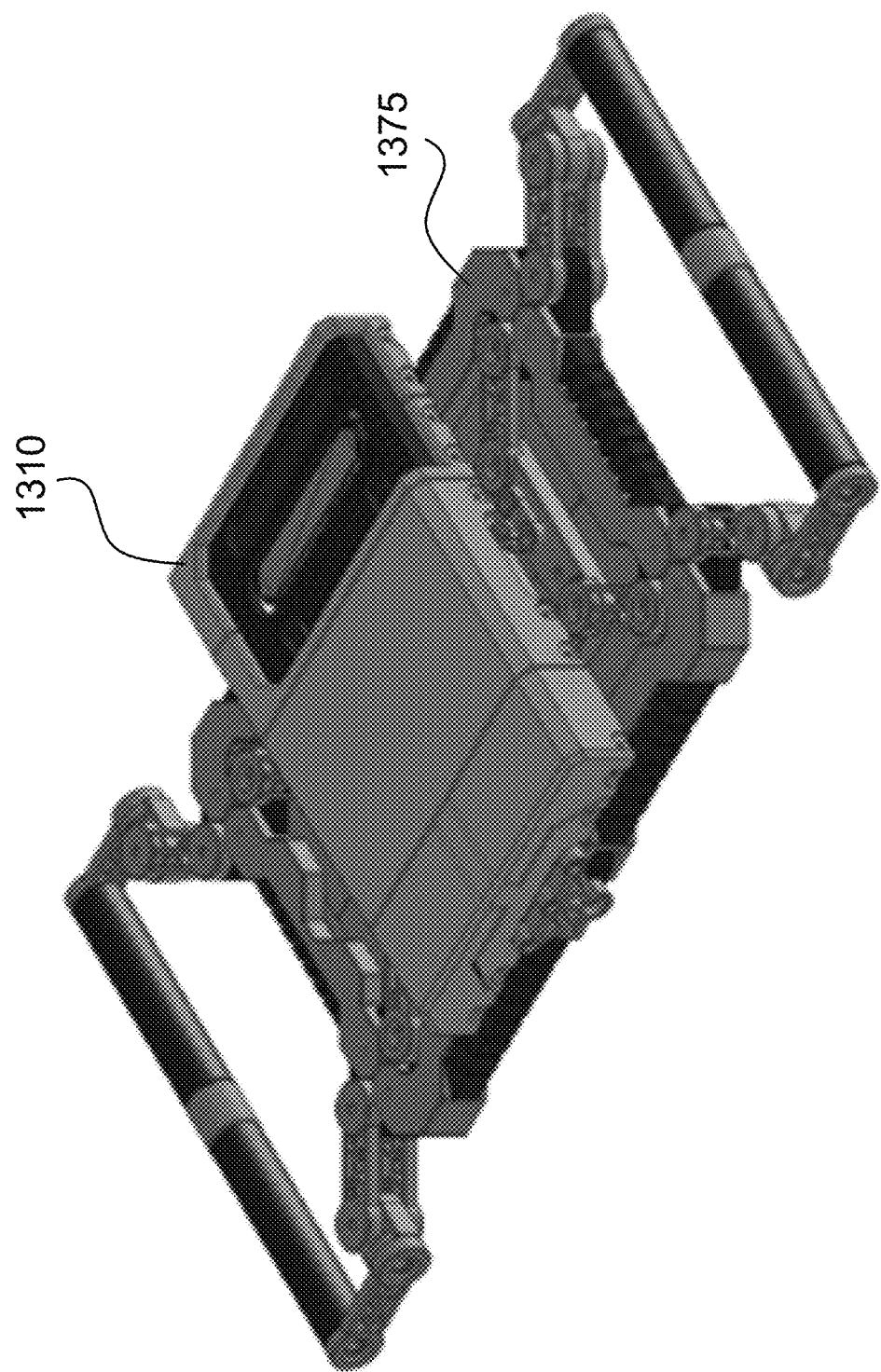
Figure 13C:
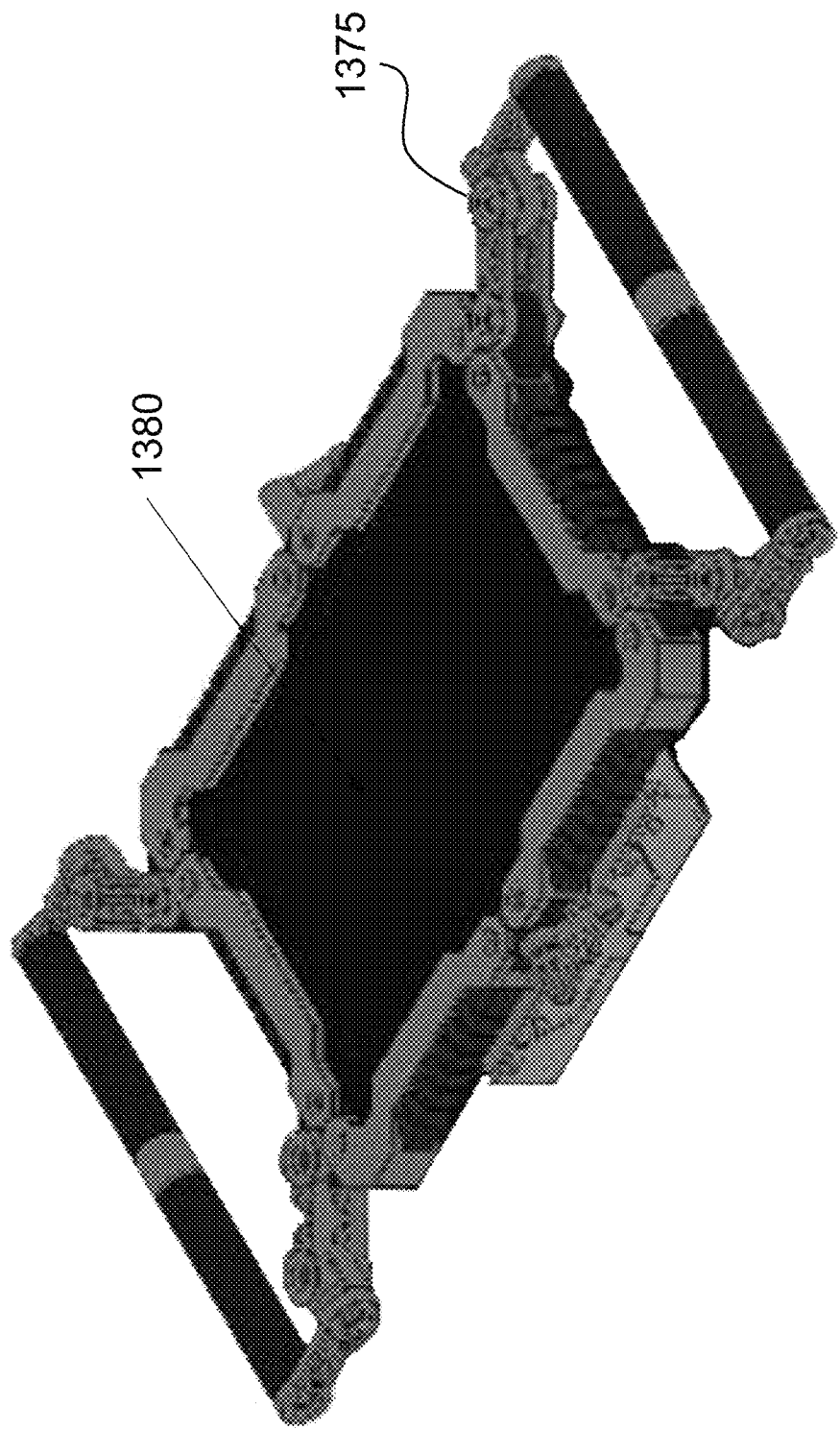

FIGS. 13A, 13B and 13C illustrate another example device for sign language recognition using a device with multiple input and output modalities. As illustrated in FIG. 13A, the device includes active 3D sensors 1315 and passive stereo sensors (1322 and 1324). As illustrated in FIGS. 13B and 13C, the example device 1310 from FIG. 13A may be used as a handheld device when attached to a modular frame 1375 (as seen in FIG. 13B) in conjunction with a tablet 1380 (as seen in FIG. 13C), providing an implementation with input and output capabilities that is suited for sign language translation when more traditional (and expensive) infrastructure is not available. The passive stereo sensors (1322 and 1324) are more economical than a full structured light sensor, but the latter provides an accuracy that may be two orders of magnitude greater than that provided by the former.

For example, the device illustrated in FIGS. 13A-13C may be oriented so the device 1310 is facing the signer, and the tablet 1380 is facing the person holding the modular frame 1375. The device 1310, with the active 3D sensors 1315 and the passive stereo sensors (1322 and 1324), can capture the sign language movements communicated by the signer, perform sign language recognition, and display a textual output of the interpretation on the tablet 1380 screen. Alternatively, the tablet could be facing the signer, the device (with a microphone) could be facing the person holding the modular frame. In this scenario, the microphone can recognize speech, convert it to sign language, and display it on the tablet using an avatar. Thus, a person is able to communicate with a signer using implementations of the disclosed technology.

The implementations illustrated in FIGS. 8 and 13 have multiple apertures that are closely co-located. This advantageously allows stereo processing, the ability to average out noise and improve signal-to-noise ratio (SNR), and enables using fewer devices. In one example, the device illustrated in FIGS. 13A and 13B may be a more complex version of the device illustrated in FIGS. 8A and 8B. For example, the devices in FIGS. 13A and 13B may additionally include one or more of a spatial/DSP-processed mic array, a full structured light sensor and a USB hub. Different example devices that are illustrated in various figures of this document provide improved sign language recognition capabilities using multiple apertures, and may be manufactured at different price-points based on the additional capabilities supported.

As described above, using multiple apertures increases fidelity so as to enable the high-quality reproduction of the movement. This allows additional information for each pixel to be captured, which can be used to create unique feature signatures for the different movements of the sign language. The features may be leveraged to identify the movements in the subsequent processing stage. In an example, a feature signature may be the right hand of the subject moving horizontally within a particular 3D volume in a particular amount of time. Features such as these, in combination with other sign language movements and the subject's emotions, may be mapped onto an interpretation of the sign language.

For example, the feature signatures from each of these different modalities may be combined through a point-cloud model, or a multi-camera, or multi-frame 3D model construction algorithms or artificial intelligence (e.g., DNNs, CNNs) programs, which enables more accurate and robust recognition. As expected, increasing the number of feature signatures used results in an increase in the training set as well as the recognition network. In general, the more unique/ differentiated information is captured, the greater the accuracy (in statistical terms) of distinguishing one feature from another. The use of multiple apertures increases the amount of non-redundant data that is captured by the system.

Figure 14:
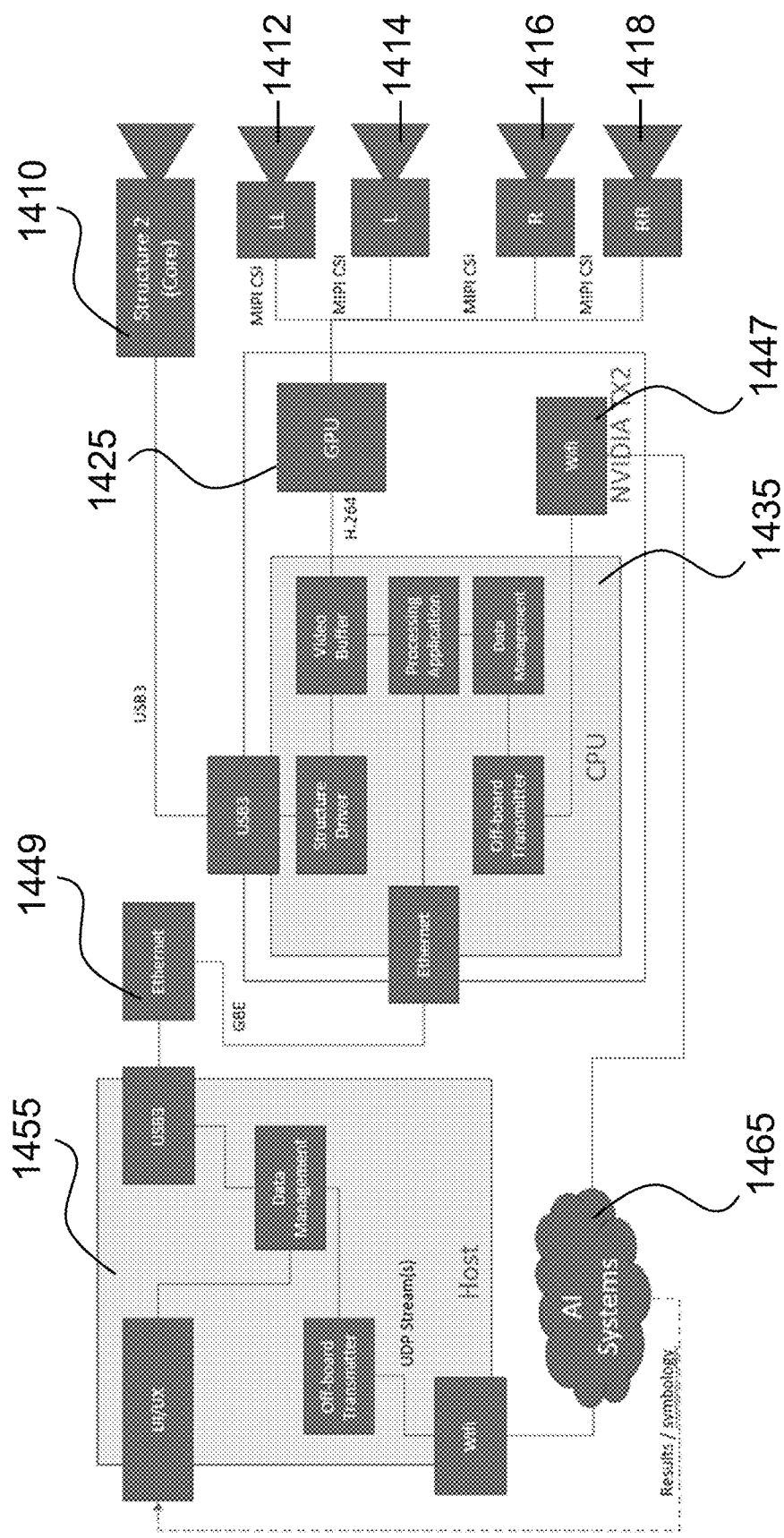
FIG. 14 illustrates example components of a system using a device for sign language recognition using a device with multiple input and output modalities.

FIG. 14 illustrates example components of a system using a device for sign language recognition using a device with multiple input and output modalities. As illustrated in the example in FIG. 14, multiple sensing devices (denoted 1410, 1412, 1414, 1416 and 1418) may be connected to a common processing structure that includes a GPU 1425, video processing capabilities and data management capabilities (which may be, in an example, co-located on a single CPU 1435), as well as communication support (e.g., Wi-Fi 1447 and Ethernet 1449). The multiple apertures of implementations of the disclosed technology capture sign language movements from different angles, and may then use an artificial intelligence system 1465 for accurate and robust detection of the movements.

Figure 15:
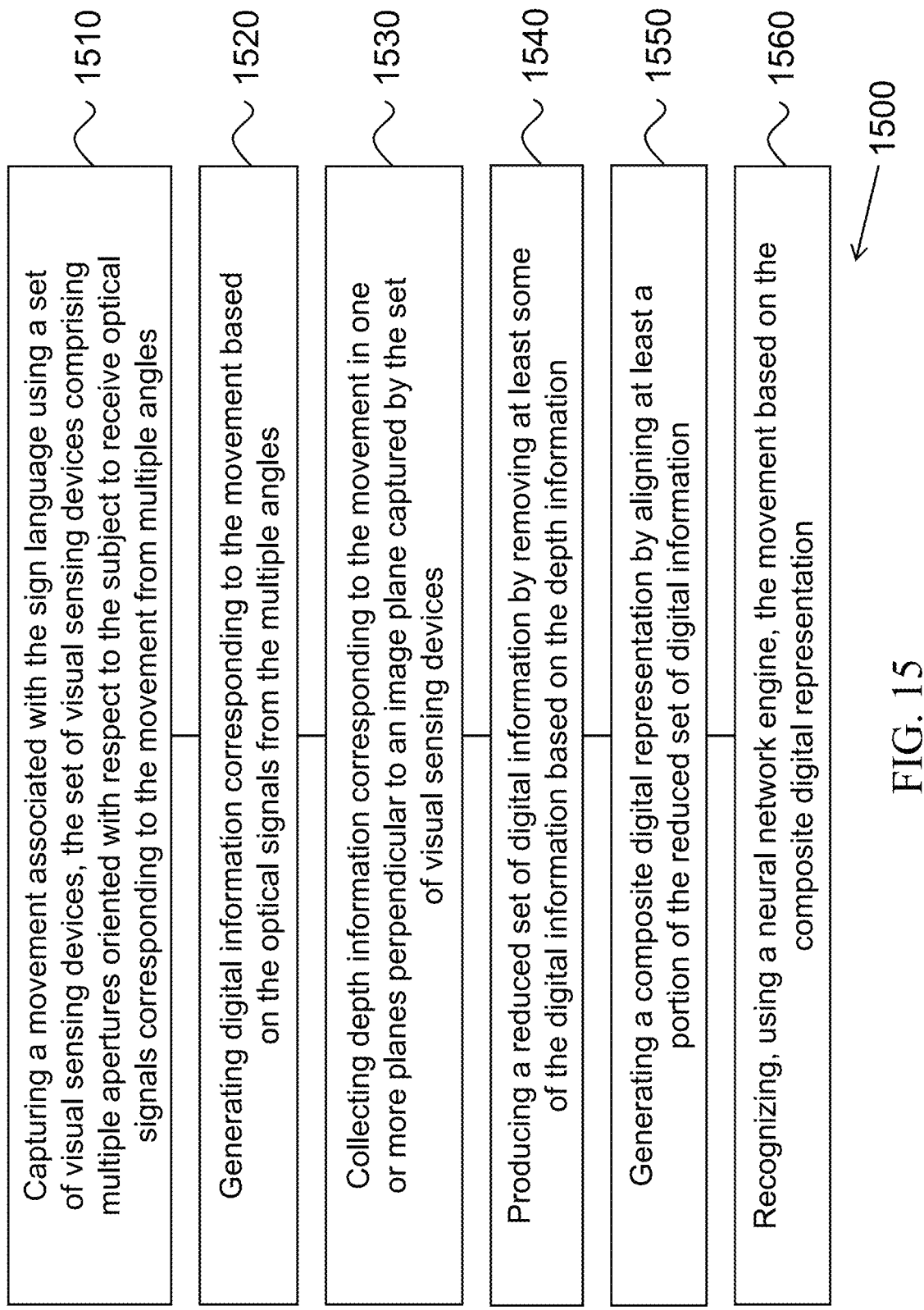
FIG. 15 illustrates a flowchart of an example method for sign language recognition using a device with multiple input and output modalities.

FIG. 15 illustrates a flowchart of an example method 1500 for sign language recognition using a device with multiple input and output modalities. The method 1500 includes, at operation 1510, capturing at least one movement associated with the sign language using a set of visual sensing devices, the set of visual sensing devices comprising multiple apertures oriented with respect to the subject to receive optical signals corresponding to the at least one movement from multiple angles. In an example, the set of visual sensing devices comprises one or more of an RGB color camera, a monochrome camera, a 3D stereo camera, a structured light emitter/receiver, or a time-of-flight emitter/receiver.

The method 1500 includes, at operation 1520, generating digital information corresponding to the at least one movement based on the optical signals from the multiple angles.

The method 1500 includes, at operation 1530, collecting depth information corresponding to the at least one movement in one or more planes perpendicular to an image plane captured by the set of visual sensing devices. In an example, collecting the depth information includes using a structured-light depth sensor or a time-of-flight depth sensor. In an example, the depth information includes a depth range from one of the set of visual sensing devices to the subject's hands. In another example, producing the set of reduced information includes removing at least some of the digital information that corresponds to depths not within the depth range.

The method 1500 includes, at operation 1540, producing a reduced set of digital information by removing at least some of the digital information based on the depth information.

The method 1500 includes, at operation 1550, generating a composite digital representation by aligning at least a portion of the reduced set of digital information. In an example, the composite digital representation may be a point-cloud or a multi-frame three-dimensional model. In another example, aligning at least the portion of the reduced set of digital information includes using one or more of a Global Positioning System (GPS) 1 pulse-per-second (PPS) signal, a networking time protocol (NTP) or an SMPTE timecode to temporally align part of the reduced set of digital information.

The method 1500 includes, at operation 1560, recognizing, using a neural network engine, the at least one movement based on the composite digital representation. In an example, recognizing the at least one movement based on the composite digital representation uses an artificial intelligence (AI)-based deep neural network (DNN) and/or convolutional neural network (CNN).

In some embodiments, the neural network engine may include one or more convolutional neural networks (CNNs) and one or more recurrent neural networks (RNNs), which may be combined in architectures that allow real-time processing for of the training images. A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs. CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory. For example, sequential information is preserved in the recurrent network's hidden state, which manages to span many time steps as it cascades forward to affect the processing of each new example. It is finding correlations between events separated by many moments, and these correlations are called "long-term dependencies", because an event downstream in time depends upon, and is a function of, one or more events that came before.

The neural network engine takes the training image(s) and performs the training accordingly, e.g., using the CNN(s) and/or RNN(s). In some embodiments, the neural network engine executes on one or more graphics processing units to leverage the parallel computing power. As discussed above, the training process can be iterative—by evaluating the performance and/or accuracy of the neural network process, the training system can determine if re-generating a different set of training images is necessary.

The method 1500 may further include capturing, using the set of visual sensing devices, one or more of an eyebrow movement, a gaze direction or one or more blinks of the subject that are associated with the at least one movement, and where recognizing the at least one movement comprises using information associated with the captured eyebrow movement, the gaze direction or the one or more blinks to improve recognition of the at least one movement. In an example, the method 1500 may use facial recognition algorithms to generate the information associated with the eyebrow movement, the gaze direction or the one or more blinks.

The method 1500 may further include capturing, using one or more audio sensors, an audible input associated with the at least one movement, and using information associated with the audible input to improve recognition of the at least one movement. Subjects who primarily use sign language to communicate may try to accommodate for hearing people with poor signing skills by vocalizing the words sometimes, or to convey additional aspects of the information being signed. Implementations of the disclosed technology are able to capture this audio input, and use it to improve the recognition of the movements of the signed language.

The method 1500 may further include capturing, using the set of visual sensing devices, external information indicated by the subject. The external information, which may include the subject pointing to a portion of text, or an object or person in the vicinity of the subject, will typically augment the information being signed. This external information can be captured and used to recognition of the associated movement.

Figure 16:
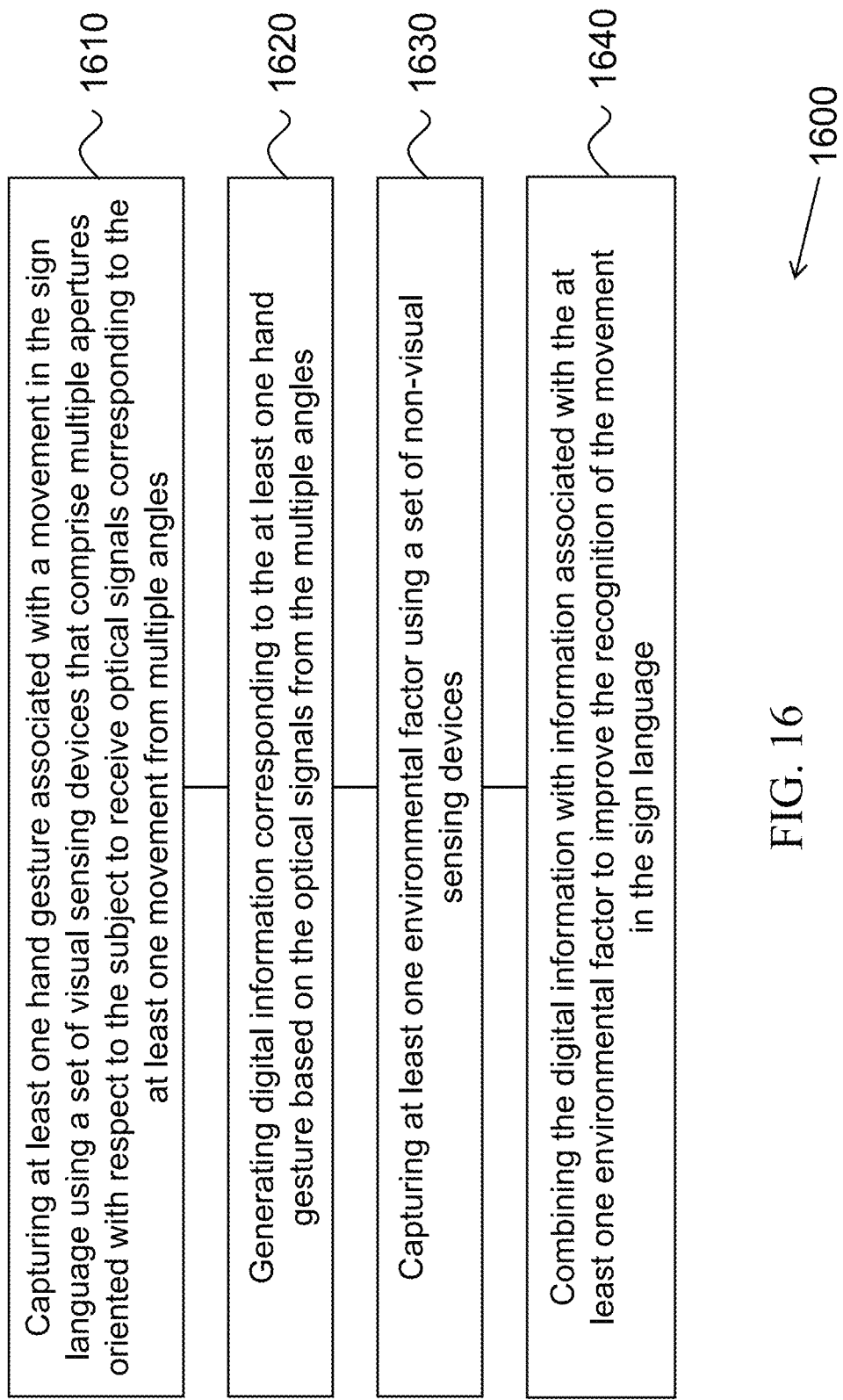
FIG. 16 illustrates a flowchart of another example method for sign language recognition using a device with multiple input and output modalities.

FIG. 16 illustrates a flowchart of an example method 1600 for sign language recognition using a device with multiple input and output modalities. The method 1600 includes, at operation 1610, capturing at least one hand gesture associated with a movement in the sign language using a set of visual sensing devices. In some embodiments, the set of visual sensing devices include multiple apertures oriented with respect to the subject to receive optical signals corresponding to the at least one movement from multiple angles.

The method 1600 includes, at operation 1620, generating digital information corresponding to the at least one hand gesture based on the optical signals from the multiple angles. In some embodiments, the method 1600 further includes the operation of combining the optical signals from the multiple angles after aligning their respective timestamps (e.g., using the 1 PPS or the GPS signal for synchronization and alignment).

The method 1600 includes, at operation 1630, capturing at least one environmental factor using a set of non-visual sensing devices.

The method 1600 includes, at operation 1640, combining the digital information with information associated with the at least one environmental factor to improve the recognition of the movement in the sign language.

Figure 17:
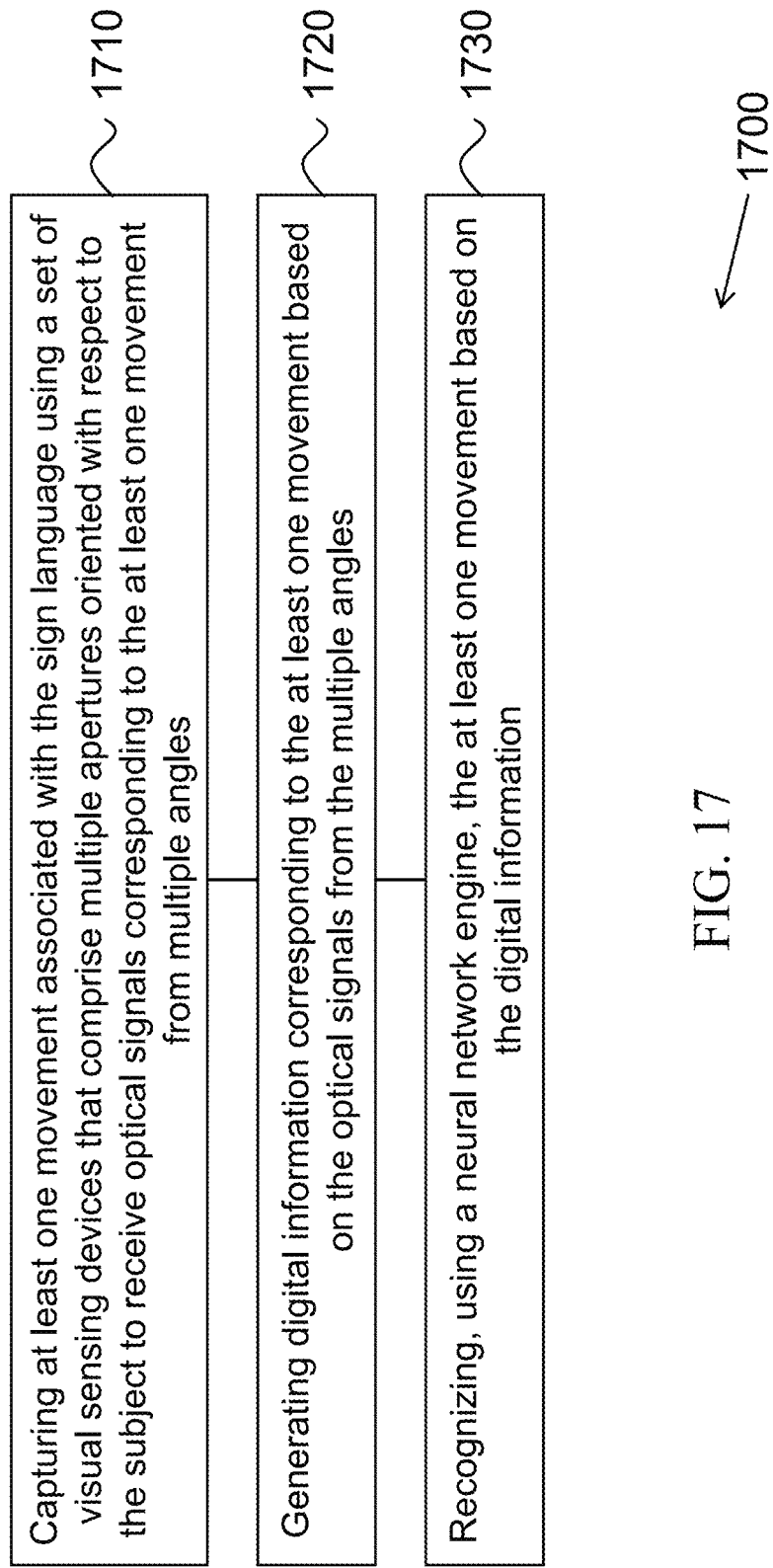
FIG. 17 illustrates a flowchart of yet another example method for sign language recognition using a device with multiple input and output modalities.

FIG. 17 illustrates a flowchart of an example method 1700 for sign language recognition using a device with multiple input and output modalities. The method 1700 includes, at operation 1710, capturing at least one movement associated with the sign language using a set of visual sensing devices that comprise multiple apertures oriented with respect to the subject to receive optical signals corresponding to the at least one movement from multiple angles.

The method 1700 includes, at operation 1720, generating digital information corresponding to the at least one movement based on the optical signals from the multiple angles.

The method 1700 includes, at operation 1730, recognizing, using a neural network engine, the at least one movement based on the digital information.

Some aspects of the disclosed embodiments relate to a non-transitory computer readable medium having processor code stored thereon including program code for performing a method for recognizing a sign language communicated by a subject. Such a method includes capturing at least one movement associated with the sign language using a set of visual sensing devices, where the set of visual sensing devices include multiple apertures oriented with respect to the subject to receive optical signals corresponding to the at least one movement from multiple angles. The method also includes generating digital information corresponding to the at least one movement based on the optical signals from the multiple angles, collecting depth information corresponding to the at least one movement in one or more planes perpendicular to an image plane captured by the set of visual sensing devices, and producing a reduced set of digital information by removing at least some of the digital information based on the depth information. The method additionally includes generating a composite digital representation by aligning at least a portion of the reduced set of digital information, and recognizing, using a neural network engine, the at least one movement based on the composite digital representation.

In some embodiments, collecting the depth information includes using a structured-light depth sensor or a time-of-flight depth sensor. In some embodiments, the above noted method further includes capturing, using the set of visual sensing devices, one or more of an eyebrow movement, a gaze direction or one or more blinks of the subject that are associated with the at least one movement. In such embodiments, recognizing the at least one movement comprises using information associated with the captured eyebrow movement, the gaze direction or the one or more blinks to improve recognition of the at least one movement.

According to some embodiments, the above method further using a facial recognition algorithm to generate the information associated with the eyebrow movement, the gaze direction or the one or more blinks. In yet another embodiment, the set of visual sensing devices comprises one or more of an RGB color camera, a monochrome camera, a 3D stereo camera, a structured light emitter/receiver, or a time-of-flight emitter/receiver. In still another embodiment, aligning the at least a portion of the reduced set of digital information includes using one or more of a Global Positioning System (GPS) 1 pulse-per-second (PPS) signal, a networking time protocol (NTP) or an SMPTE timecode to temporally align part of the reduced set of digital information.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of at least some of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for recognizing a sign language communicated by a subject, comprising:
   a set of visual sensing devices to capture, from multiple angles, at least one movement associated with the sign language;
   a depth sensor to collect depth information corresponding to the at least one movement; and
   a processor and a memory including instructions stored thereupon, the instructions upon execution by the processor causes the processor to:
      generate digital information corresponding to the at least one movement;
      produce a reduced set of digital information by removing at least some of the digital information based on the depth information collected by the depth sensor;
      generate a composite digital representation by aligning at least a portion of the reduced set of digital information; and
      identify, using a neural network engine, the at least one movement based on the composite digital representation.

2. The apparatus of claim 1, wherein the depth sensor is a structured-light depth sensor or a time-of-flight depth sensor.

3. The apparatus of claim 1,
   wherein the set of visual sensing devices is further configured to:
      capture one or more of an eyebrow movement, a gaze direction or one or more blinks of the subject that are associated with the at least one movement, and
   wherein the instruction upon execution by the processor further cause the processor to:
      identify the at least one movement using information associated with the captured eyebrow movement, the gaze direction or the one or more blinks.

4. The apparatus of claim 3, wherein the processor is further configured to:
   use a facial recognition algorithm to generate the information associated with the eyebrow movement, the gaze direction or the one or more blinks.

5. The apparatus of claim 1, wherein the set of visual sensing devices comprises one or more of an RGB color camera, a monochrome camera, a 3D stereo camera, a structured light emitter/receiver, or a time-of-flight emitter/receiver.

6. The apparatus of claim 1, wherein the processor is further configured to receive one or more of a Global Positioning System (GPS) 1 pulse-per-second (PPS) signal, a networking time protocol (NTP) or an SMPTE timecode to temporally align part of the reduced set of digital information.

7. The apparatus of claim 1, wherein the apparatus is a handheld device that includes at least one display device, the at least one display device allowing a sign language rendition of a captured voice, or a textual representation of a sign language gesture including the at least one movement.

8. The apparatus of claim 1, wherein the apparatus is implemented as a multi-component device, and wherein the set of visual sensing devices includes three visual sensing devices, a first of the three visual sensing devices is positioned directly in front of the subject, a second of the three visual sensing devices is positioned substantially 90° to one side of the subject, and a third of the three visual sensing devices is positioned substantially 45° to another side of the subject.

9. The apparatus of claim 8, wherein the first, second and third of the three visual sensing devices are in a single horizontal spatial plane.

10. The apparatus of claim 8, wherein the first and second of the three visual sensing devices are in a single horizontal spatial plane, and wherein the third of the three visual sensing devices is in an elevated position approximately 25° to 30° above the single horizontal spatial plane.

11. The apparatus of claim 1, wherein the set of visual sensing devices further captures external information indicated by the subject, wherein the external information is associated with the at least one movement, and wherein identification of the at least one movement comprises using the external information to improve identification of the at least one movement.

12. The apparatus of claim 11, wherein the external information comprises a portion of a text, an object in a vicinity of the subject, or another person.

13. The apparatus of claim 11, wherein the external information comprises environmental factors.

14. A method for recognizing a sign language communicated by a subject, comprising:
   capturing, from multiple angles, at least one movement associated with the sign language using a set of visual sensing devices;
   generating digital information corresponding to the at least one movement;
   collecting depth information corresponding to the at least one movement;
   producing a reduced set of digital information by removing at least some of the digital information based on the depth information;

generating a composite digital representation by aligning at least a portion of the reduced set of digital information; and recognizing, using a neural network engine, the at least one movement based on the composite digital representation.

15. The method of claim 14, wherein collecting the depth information includes using a structured-light depth sensor or a time-of-flight depth sensor.

16. The method of claim 14, further comprising:
capturing, using the set of visual sensing devices, one or more of an eyebrow movement, a gaze direction or one or more blinks of the subject that are associated with the at least one movement, and wherein recognizing the at least one movement comprises using information associated with the captured eyebrow movement, the gaze direction or the one or more blinks to improve recognition of the at least one movement.

17. The method of claim 16, further comprising:
using a facial recognition algorithm to generate the information associated with the eyebrow movement, the gaze direction or the one or more blinks.

18. The method of claim 14, wherein the set of visual sensing devices comprises one or more of an RGB color camera, a monochrome camera, a 3D stereo camera, a structured light emitter/receiver, or a time-of-flight emitter/receiver.

19. The method of claim 14, wherein aligning the at least a portion of the reduced set of digital information includes using one or more of a Global Positioning System (GPS) 1 pulse-per-second (PPS) signal, a networking time protocol (NTP) or an SMPTE timecode to temporally align part of the reduced set of digital information.

20. The method of claim 14, wherein the composite digital representation comprises a point-cloud or a multi-frame three-dimensional model.

* * * * *